OXIDE PIEZOELECTRIC MATERIAL

May 9, 1972 NOBORU ICHINOSE ET AL 3,661,781

OXIDE PIEZOELECTRIC MATERIAL

Filed Feb. 24, 1970 17 Sheets-Sheet 2

ELECTRO-MECHANICAL COUPLING COEFFICIENT KP(%)
80
60
40
20
0
MECHANICAL QUALITY FACTOR QM
3000
2000
1000
j
k
0
25
50
Pb(Cd 1/3Nb2/3)O3(mol %)
50
42
34 PbTiO3(mol %)
50
33
16 PbZrO3(mol %)

ELECTRO-MECHANICAL COUPLING COEFFICIENT KP(%)
80
60
40
20
0
MECHANICAL QUALITY FACTOR QM
3000
2000
1000
j'
k'
15
30
45
60
PbTiO3(mol %)
75
60
45
30
PbZrO3(mol %)

United States Patent Office 3,661,781
Patented May 9, 1972

3,661,781
OXIDE PIEZOELECTRIC MATERIAL

Noboru Ichinose, Yokohama-shi, Harutoshi Egami, Tokyo, and Katsunori Yokoyama and Yoshikazu Tanno, Yokohama-shi, Japan, assignors to Tokyo Shibaura Electric Co., Ltd., Kawasaki-shi, Japan Filed Feb. 24, 1970, Ser. No. 13,741
Claims priority, application Japan, Feb. 24, 1969, 44/13,164; July 22, 1969, 44/57,424; Aug. 11, 1969, 44/62,902; Oct. 14, 1969, 44/81,526; Nov. 26, 1969, 44/94,250
Int. Cl. C04b *35/46, 35/48*
U.S. Cl. 252—62.9 6 Claims

ABSTRACT OF THE DISCLOSURE

An oxide piezoelectric material essentially consisting of 50.0 to 1.0 mol percent of $Pb(Cd_{1/3}\cdot Nb_{2/3})O_3$, 34.0 to 55.5 mol percent of $PbTiO_3$ and 16.0 to 53.3 mol percent of $PbZrO_3$ assuming the form of solid solution. The material may further contain at least one of $MnO_2$, $Cr_2O_3$, NiO, CoO, $La_2O_3$, $Bi_2O_3$, $ThO_2$ and $CeO_2$.

The present invention relates to an oxide piezoelectric material and particularly to an oxide piezoelectric material essentially consisting of a solid solution involving $Pb(Cd_{1/3}\cdot Nb_{2/3})O_3$, $PbTiO_3$ and $PbZrO_3$ synthesized by solid phase reaction from various kinds of oxides.

As is well known, piezolectric materials are widely used as a transducer, for example, an oscillation element for generating supersonic waves or an element involved in a mechanical filter, ceramic filter, pickup, microphone and oscillograph and also as an ignition plug for gas implements and lighters. For such application there have already been provided oxide piezoelectric materials of the so-called $Pb(Ti\text{-}Zr)O_3$ system prepared into the form of solid solution consisting of, for example, equal mols of $PbTiO_3$ and $PbZrO_3$. Piezoelectric materials of the aforesaid system indeed have more excellent piezoelectric properties than those like $BaTiO_3$, but have the drawbacks that they generally display unsatisfactory sintering properties, a small mechanical quality factor $Q_M$ and a relatively small electro-mechanical coupling coefficient, failing fully to meet practical requirements.

Recently, there have been made advanced studies in improving the piezoelectric materials of the $Pb(Ti\text{-}Zr)O_3$ system, as disclosed in a great deal of literature and numerous patents. The proposed methods for improving said piezoelectric properties may be broadly classified into the following two categories:

(1) Incorporation of additives in the basic constituent of a piezoelectric material, (2) Addition of a third component to two components forming said basic constituent to prepare a ternary product.

While these approaches are gradually improving the piezoelectric properties, they are still unsatisfactory as exemplified below:

(a) Referring to the process (1) above of incorporating additives, there is known a method of adding CdO or ZnO to the basic constituent as disclosed in the British Pat. 953,408. Even with a piezoelectric material whose properties are improved by this method, the electromechanical coupling coefficient $K_p$ stands at 37 to 48%, namely, does not attain 50%.

(b) With respect to the process (2) above of adding a third component, there is proposed a ternary product consisting of $PbTiO_3$ and $PbZrO_3$ as basic components and $Pb(Mg_{1/3}\cdot Nb_{2/3})$ as a third component (Journal of American Ceramic Society, vol. 48, No. 12, pp. 530–635, 1965). With this process, $K_p$ does not account for 50% and $Q_M$ falls below 600. To give an extreme case, $K_p$ only indicates 7.5% when $Q_M$ stands at 568.

With oxide piezoelectric materials, it is generally demanded that both $K_p$ and $Q_M$ be as large as possible. Where there is prepared a piezoelectric material as an element for electro-mechanical conversion of oscillations in a mechanical filter or as an element for electro-acoustic conversion of oscillations in a powerful supersonic wave oscillator, a large value of $K_p$ improves the efficiency of conversion, offering many advantages from the standpoint of circuit arrangement. Further, where there is to be conducted an electro-mechanical acoutic conversion, a large value of $Q_M$ reduces loss occurring in an oscillation element and in consequence unnecessary energy loss. This is the reason why the piezoelectric material is required to have a large value of both $K_p$ and $Q_M$. The good properties of a piezoelectric element assumes great importance when it is employed in numerous applications, particularly electrical communication where there is being made prominent technical progress. Accordingly, there is great demand for development of a piezoelectric material having excellent properties.

The object of the present invention is to provide an oxide piezoelectric material which indicates high stable values of both electro-mechanical coupling coefficient and mechanical quality factor regardless of temperature change and over a long period of time.

The present invention provides an oxide piezoelectric material essentially consisting of a solid solution represented by the following formula:

$$x\cdot Pb(Cd_{1/3}\cdot Nb_{2/3})O_3\text{-}y\cdot PbTiO_3\text{-}z\cdot PbZrO_3$$

where:

$x$=50.0 to 1.0 mol percent
$y$=34.0 to 55.5 mol percent
$z$=16.0 to 53.5 mol percent For improvement of its properties, this piezoelectric material may contain an auxiliary component such as $MnO_2$, $Cr_2O_3$, NiO, CoO, $La_2O_3$, $Bi_2O_3$, $ThO_2$ or $CeO_2$. These auxiliary oxide components may be added to said solid solution or basic constitutent alone or in combination as NiO and CoO, $La_2O_3$ and $Bi_2O_3$, or $ThO_2$ and $CeO_2$.

It has been found that the oxide piezoelectric material of the present invention, with or without such auxiliary component, has a noticeable advantage that it displays prominently higher values of both electro-mechanical coupling coefficient and mechanical quality factor then those previously known and that these properties remain very stable regardless of temperature change and over a long period of time. When determined for variations in the resonance frequency over a temperature range of −40° to 80° C., a resonator prepared from the oxide piezoelectric material of the present invention showed variations of ±0.1% at most, whereas that of the prior art material varied as much as about ±0.3%. Further when examined for qualitative deterioration during a period of 1,000 hours after polarization, the resonator of the present invention indicated variations of ±0.1% at most as against 0.4% observed in that of the prior art. (Variations in the resonance frequency over a temperature range of −40° to 80° C. are presented in Examples IV and V.)

This invention can be more fully understood from the following detailed description when taken in connection with reference to the accompanying drawings, in which:

FIG. 10 is a curve diagram of the relationship of temperature and dielectric constant and FIG. 11 is a curve diagram of the relationship of temperature and electro-mechanical coupling coefficient;

Figure 12:
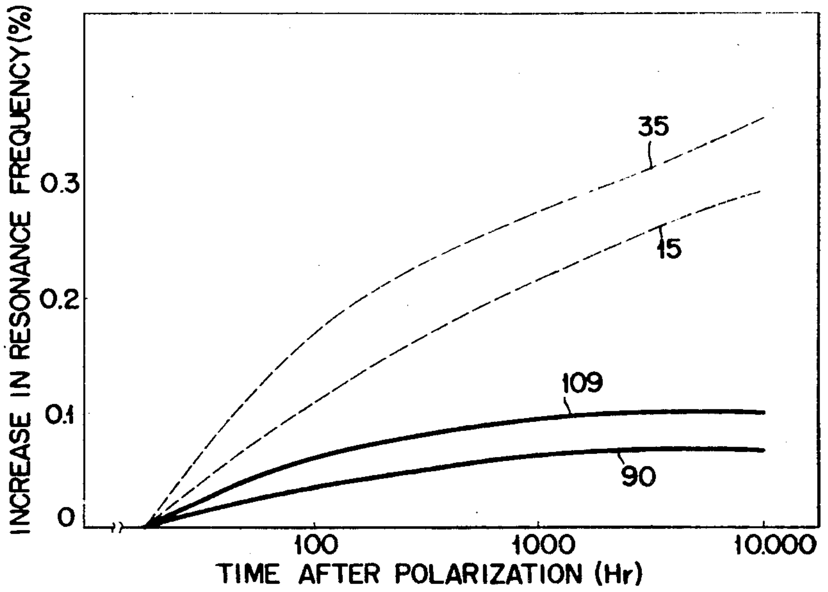
Figure 13:
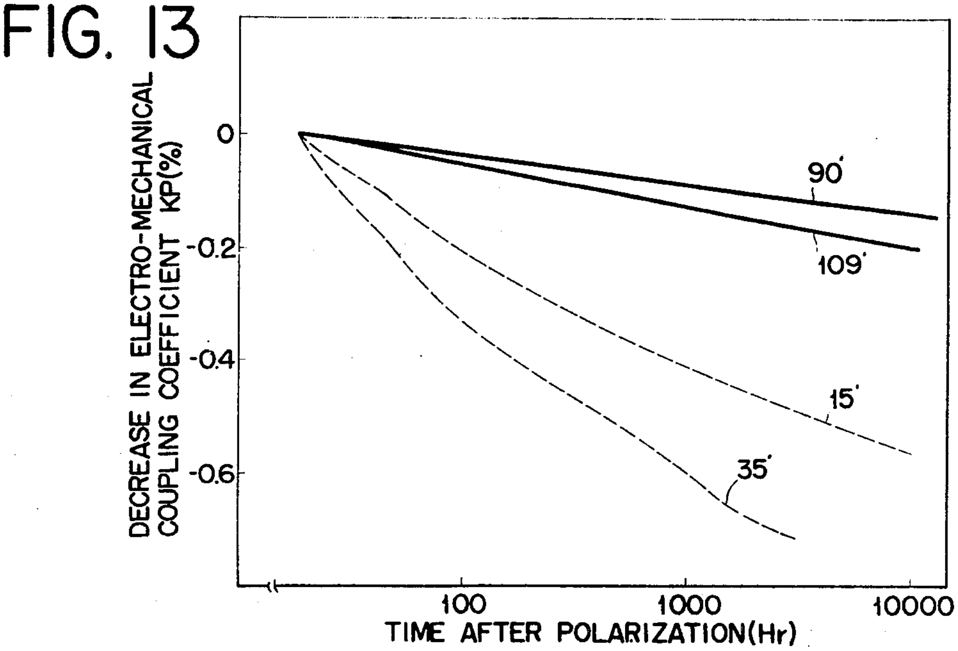
Figure 14:
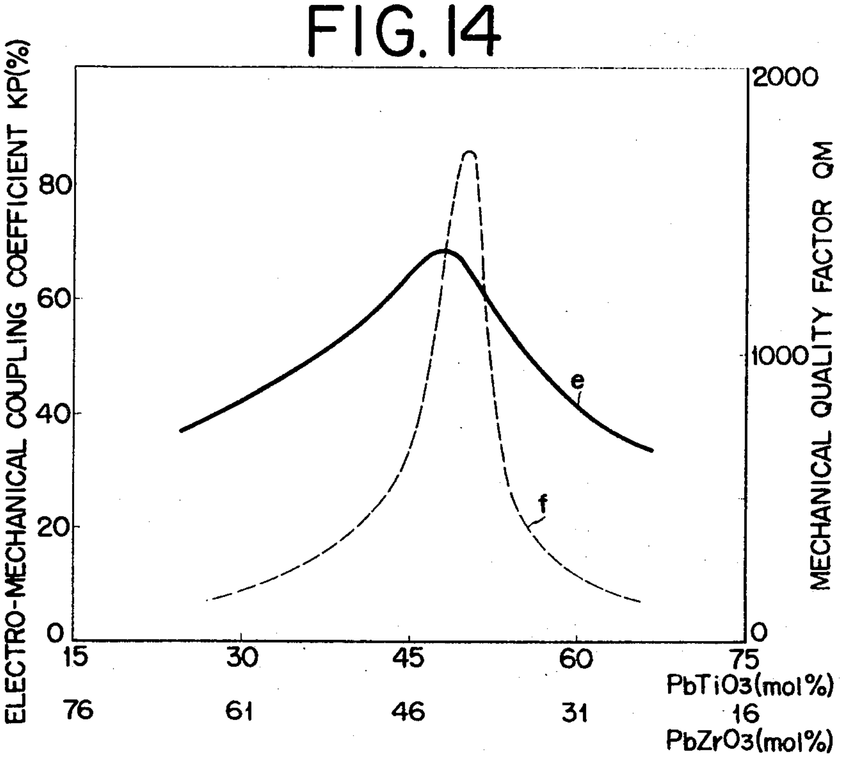
Figure 15:
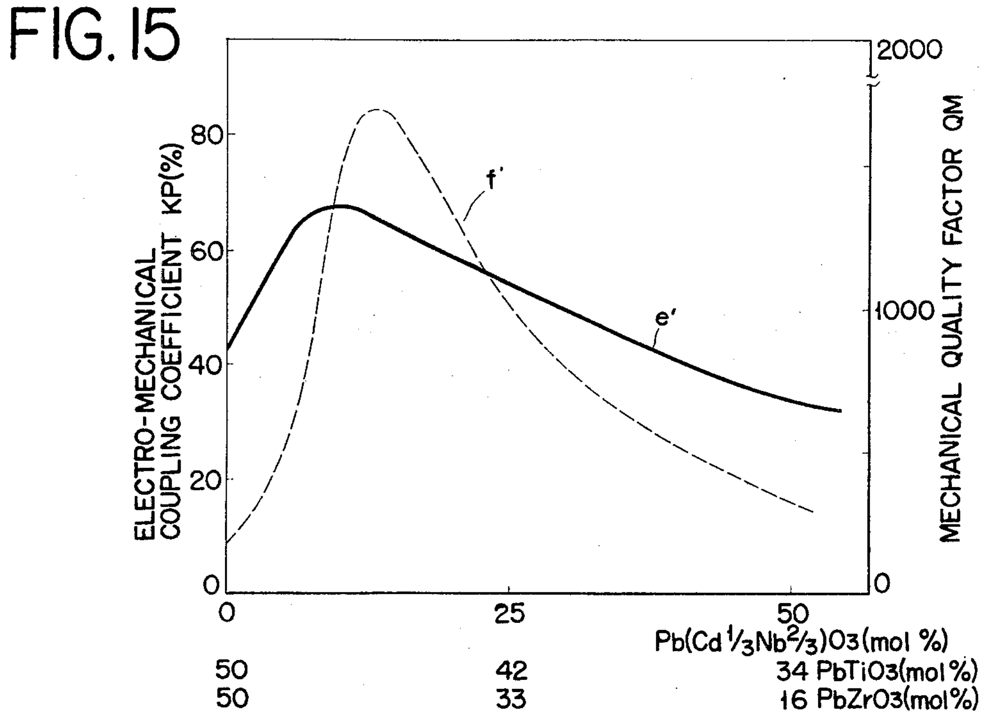
Figure 16:
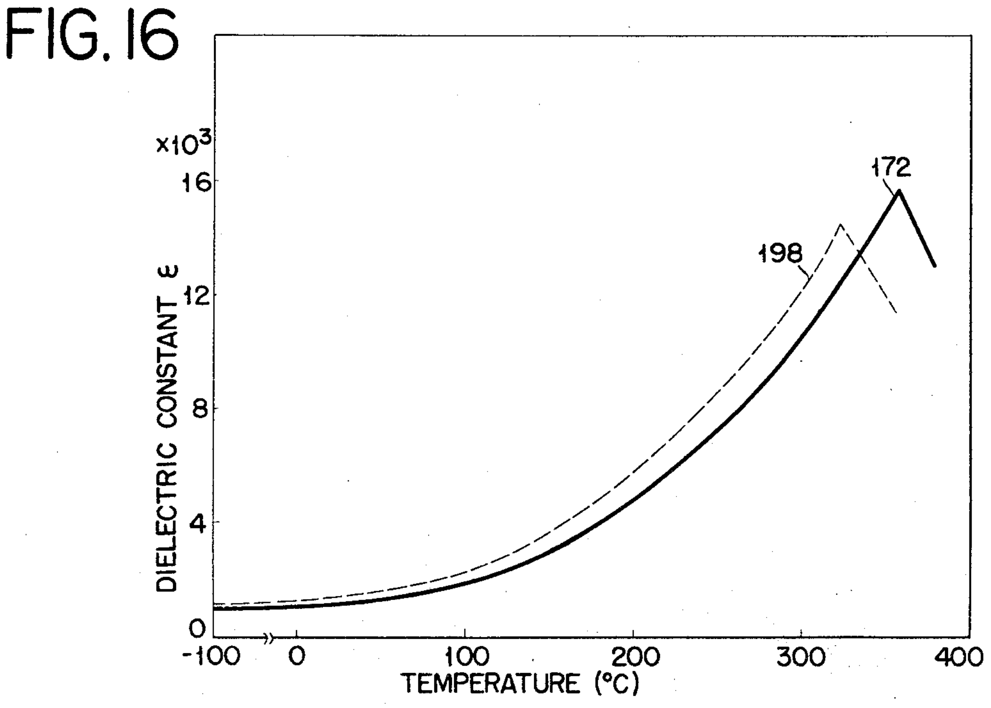
Figure 17:
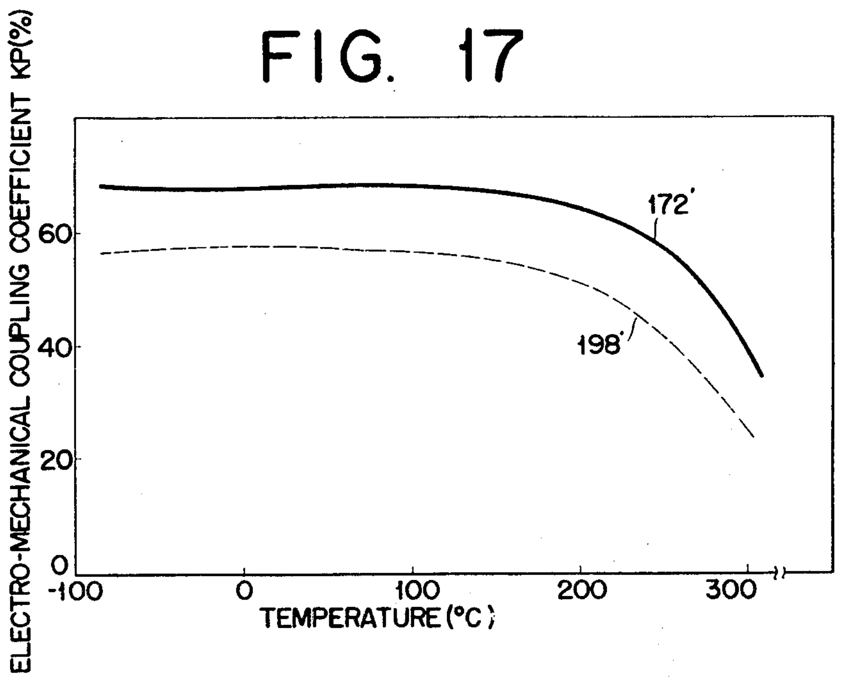
Figure 18:
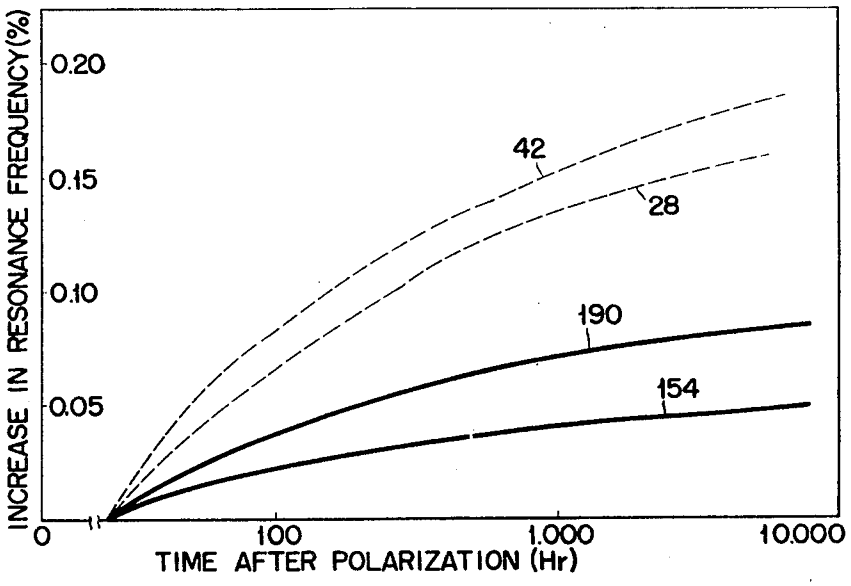
Figure 19:
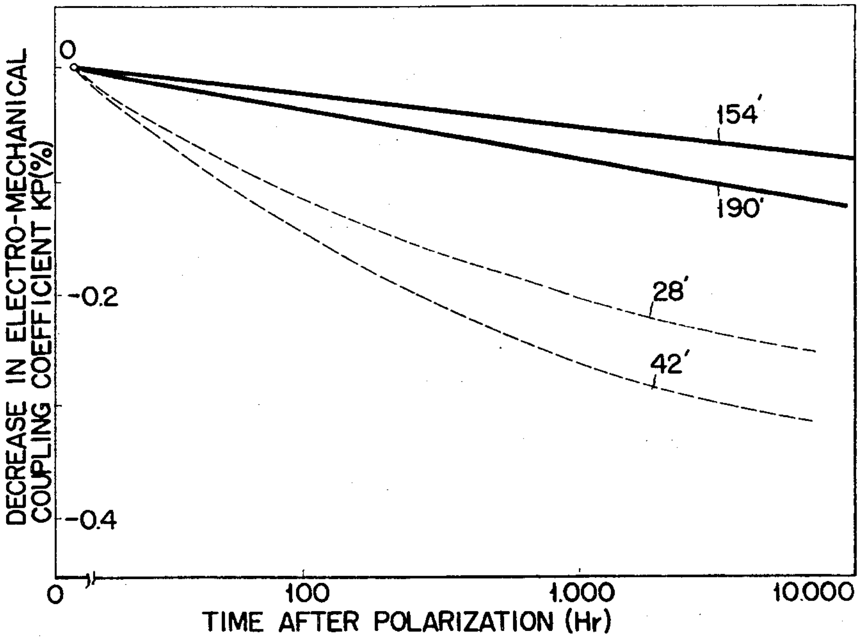
Figure 33:
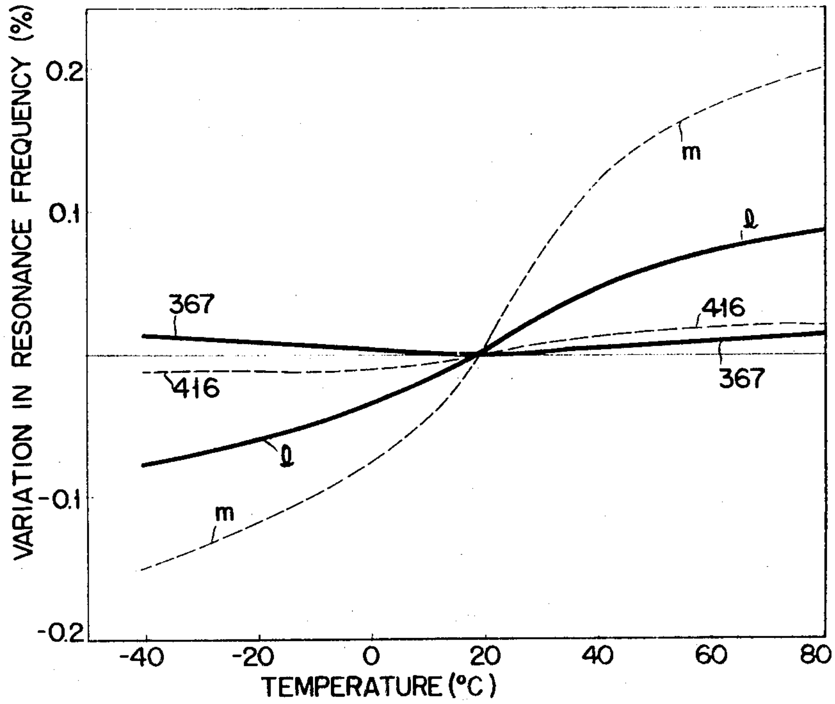
Figure 20:
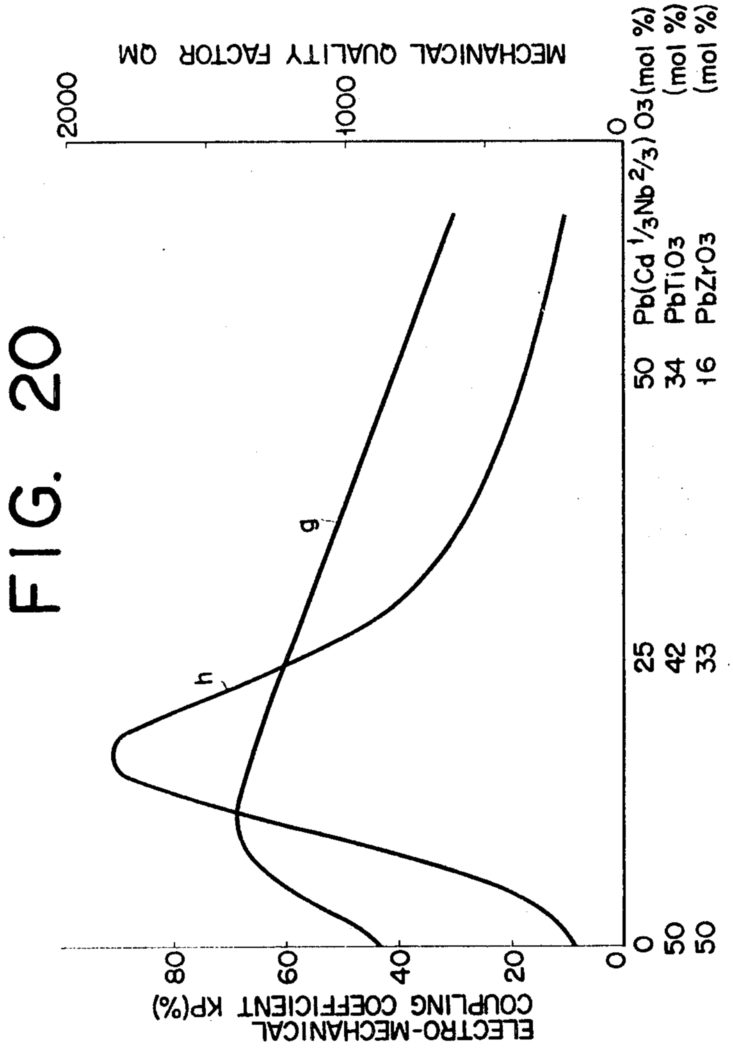
Figure 21:
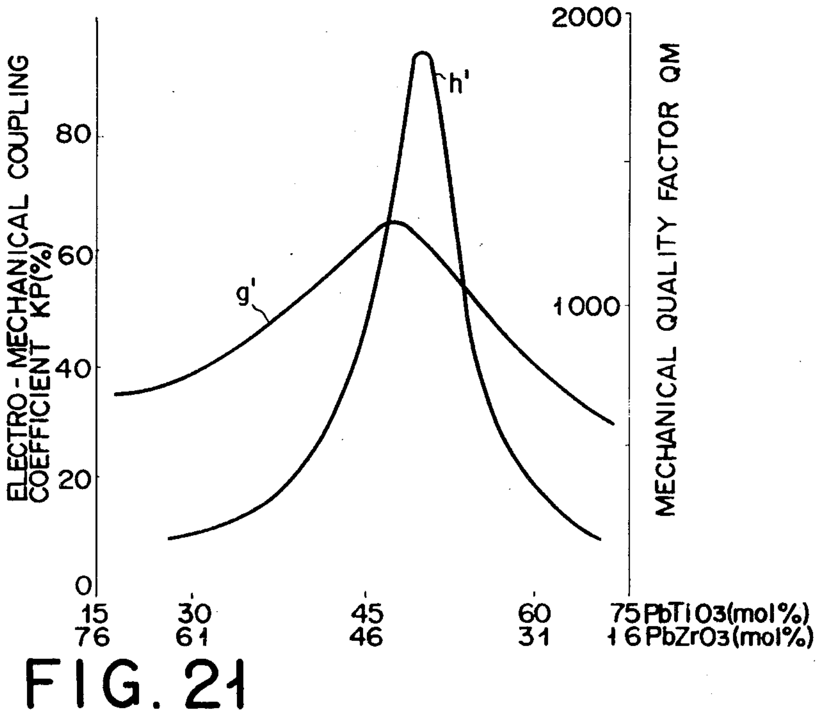
Figure 22:
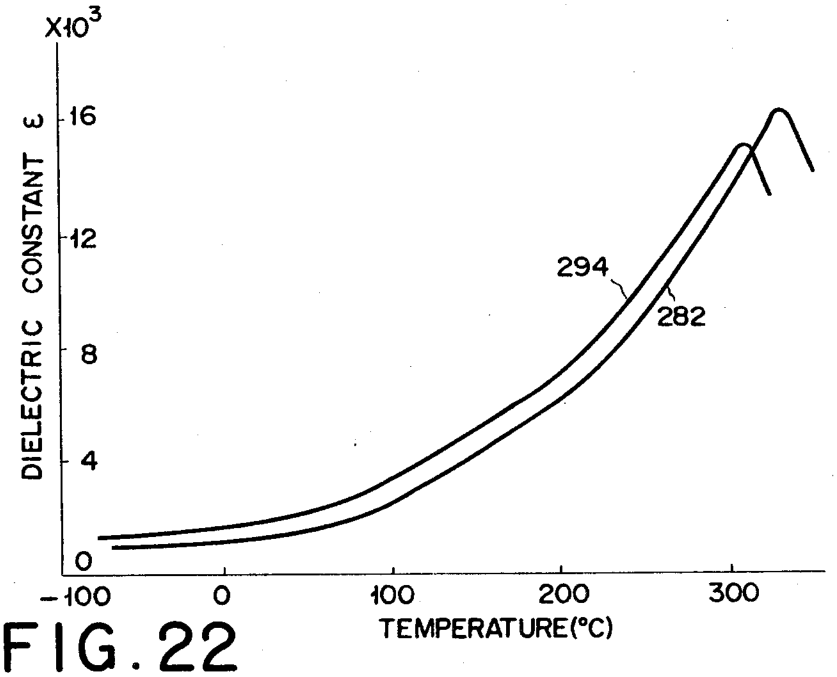
Figure 23:
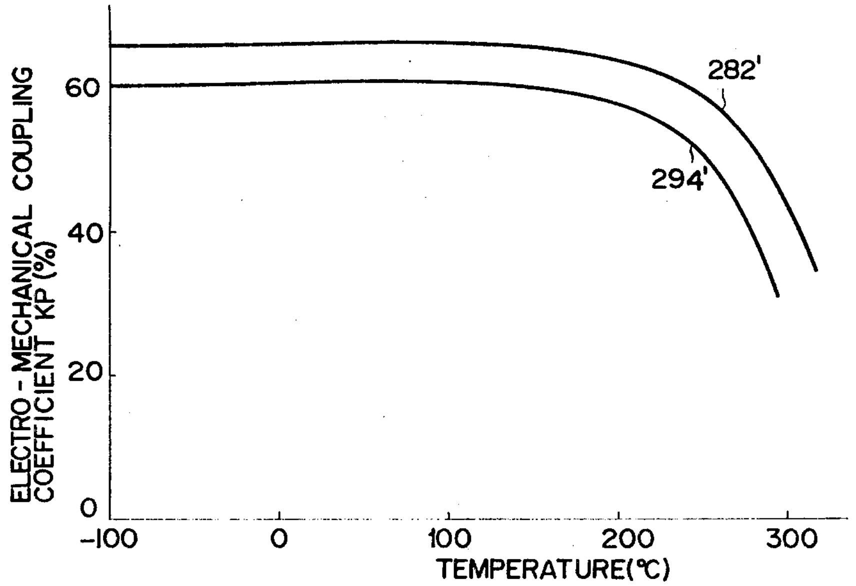
Figure 24:
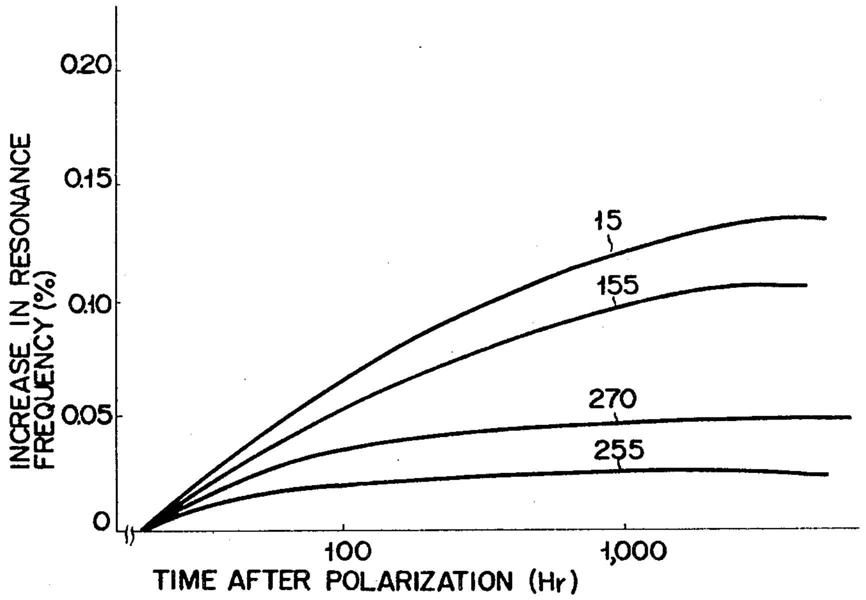
Figure 25:
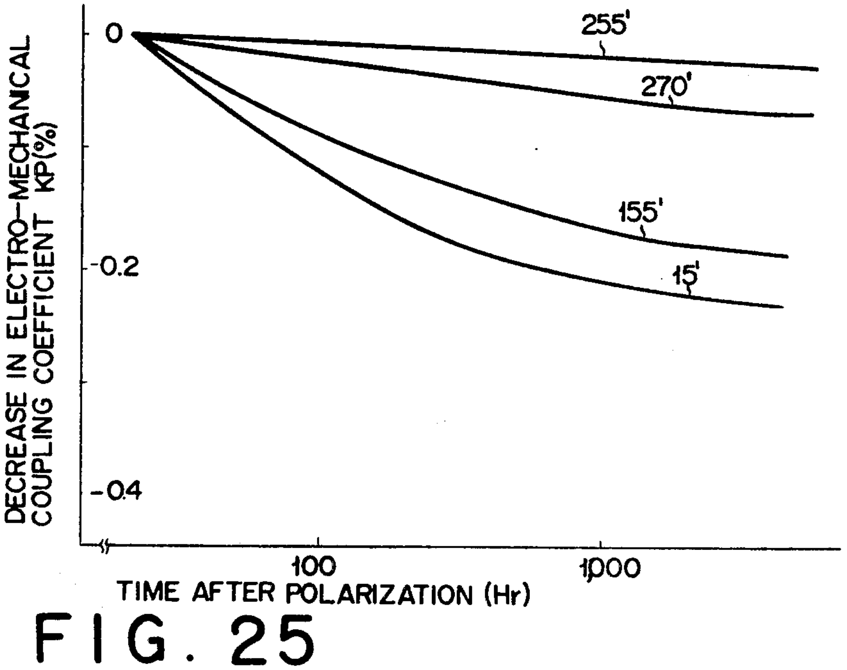
Figure 26:
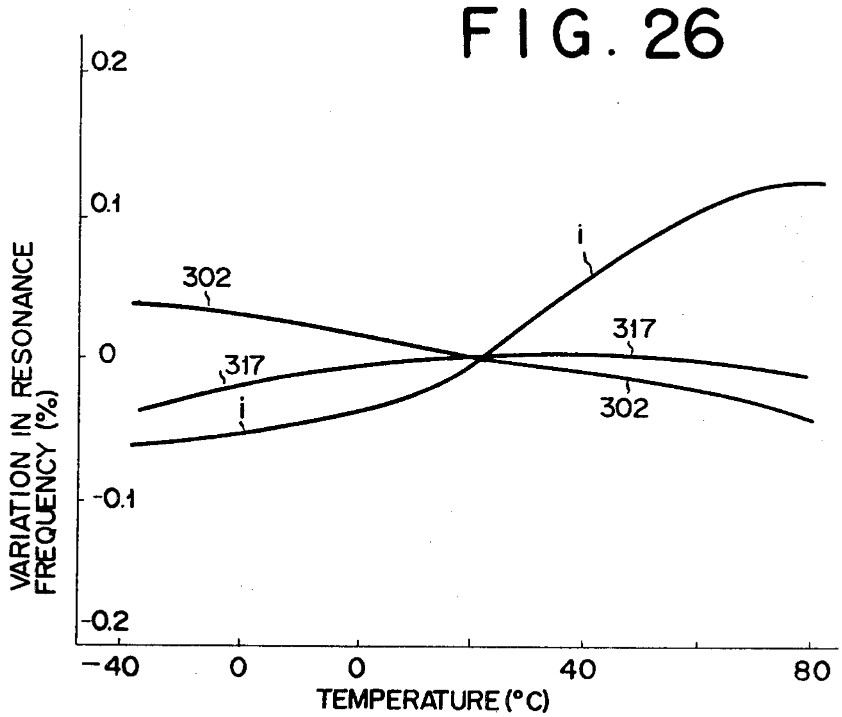
Figure 27:
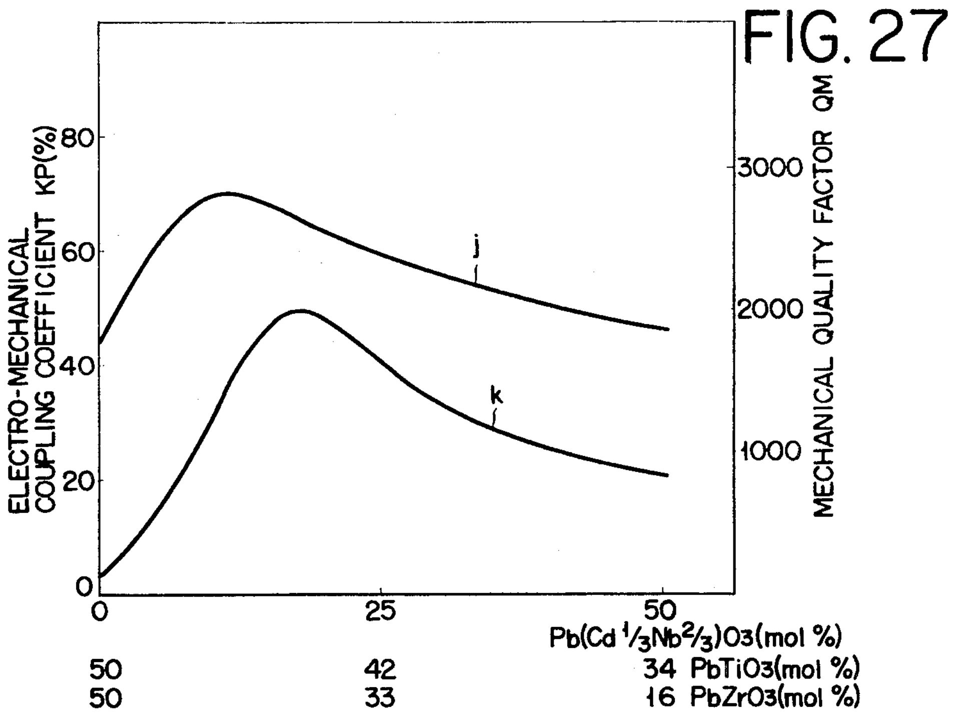
Figure 28:
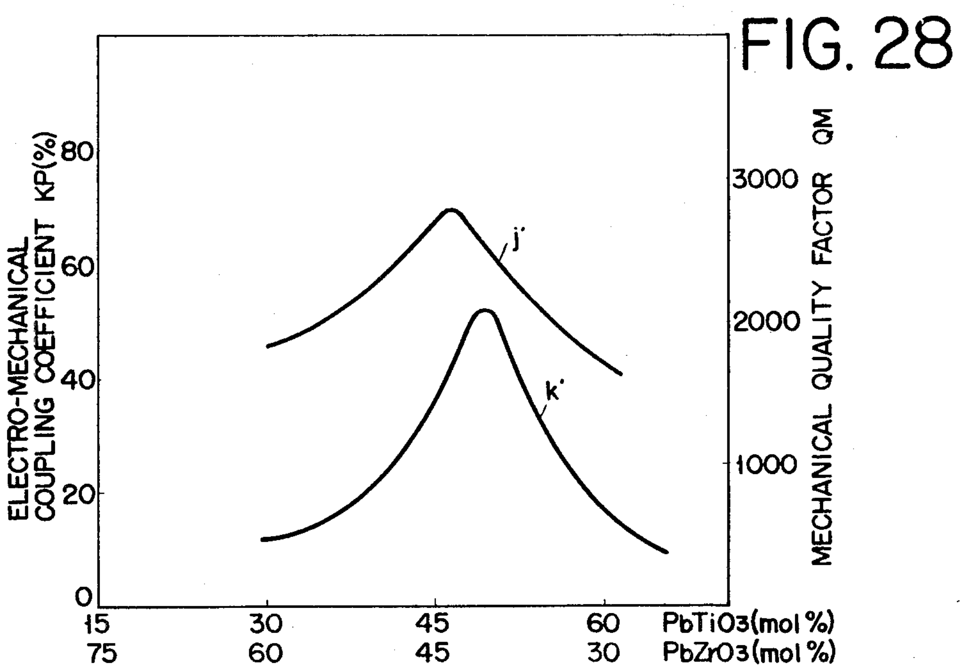
Figure 29:
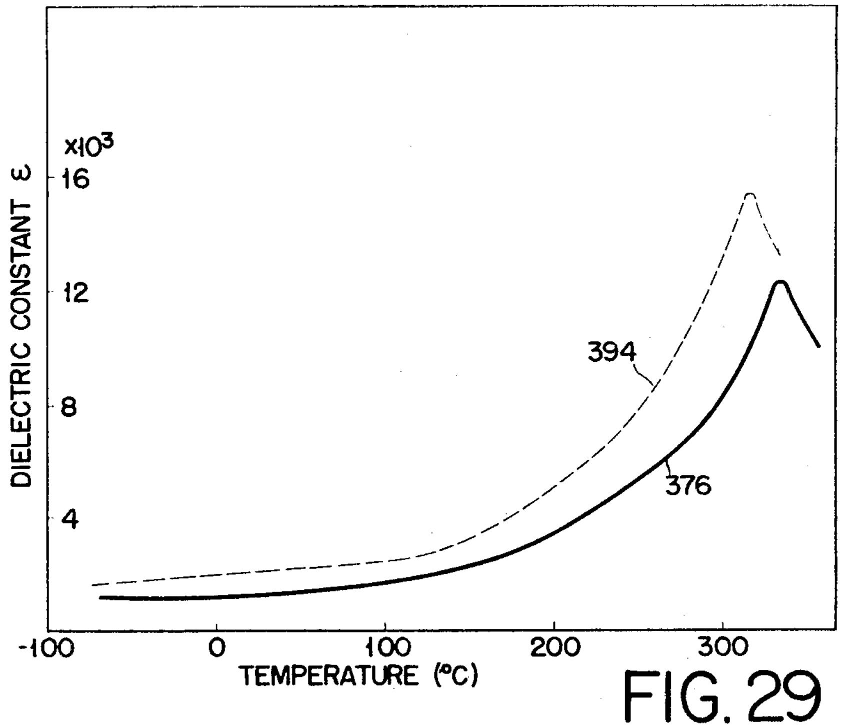
Figure 30:
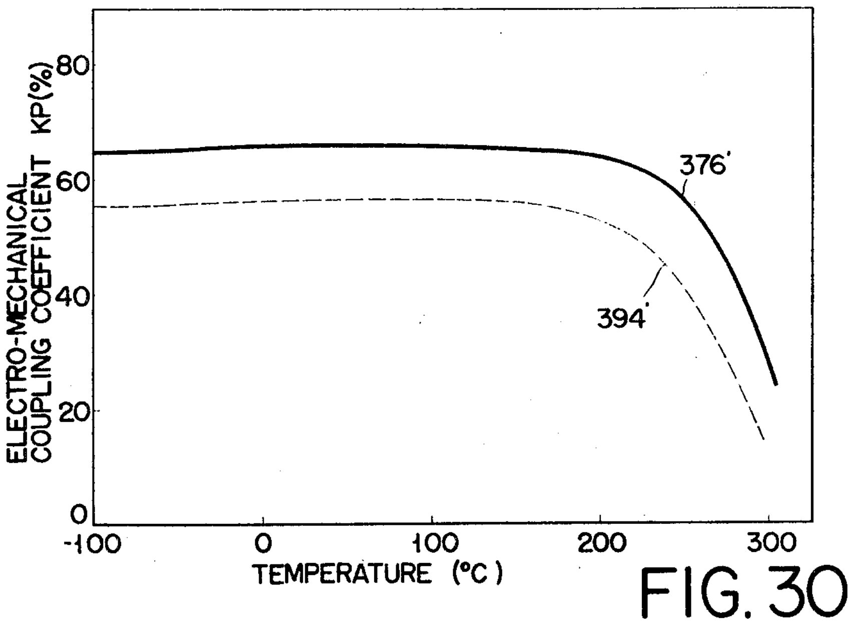
Figure 31:
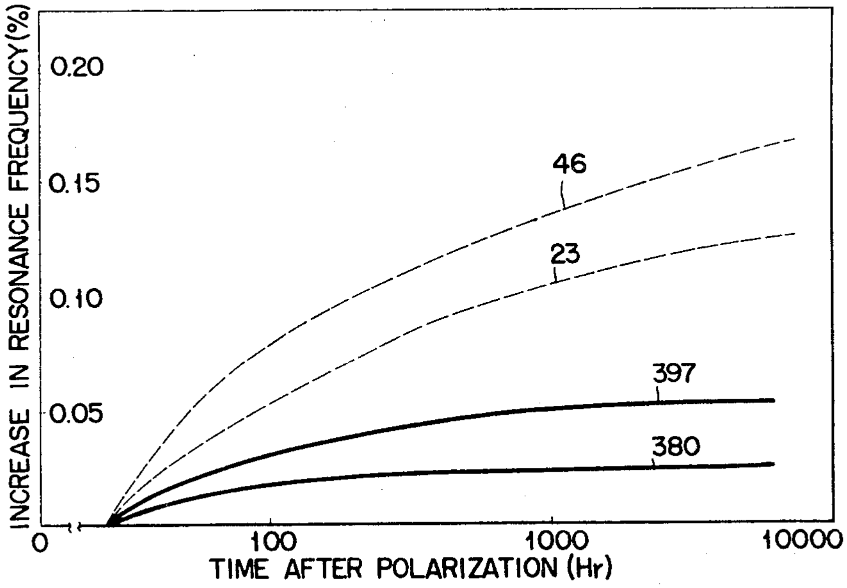
Figure 32:
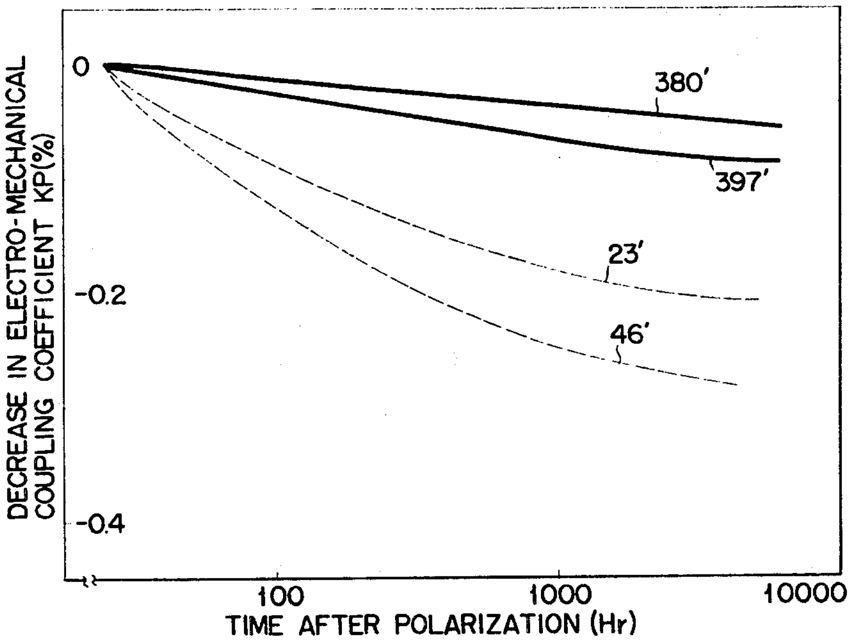

FIGS. 12 and 13 comparatively indicate the properties after polarization of two samples of the invention only consisting of the basic constituent and two other samples containing auxiliary $Cr_2O_3$; FIG. 12 is a curve diagram of change with time in the resonance frequency and FIG. 13 is a curve diagram of change with time in the electro-mechanical coupling coefficient;

FIG. 14 is a curve diagram of piezoelectric properties where the proportions of $PbTiO_3$ and $PbZrO_3$ are varied with those of $Pb(Cd_{1/3}\cdot Nb_{2/3})O_3$ and auxiliary NiO fixed;

FIG. 15 is a curve diagram of piezoelectric properties where the proportions of $Pb(Cd_{1/3}\cdot Nb_{2/3})O_3$, $PbTiO_3$ and $PbZrO_3$ are varied with that of auxiliary CoO fixed;

FIGS. 16 and 17 show the properties of oxide piezoelectric materials containing NiO and CoO respectively as an auxiliary component; FIG. 16 is a curve diagram of the relationship of temperature and dielectric constant and FIG. 17 is a curve diagram of the relationship of temperature and electro-mechanical coupling coefficient;

FIGS. 18 and 19 show the properties after polarization of two samples of the invention consisting of the basic constituent and two other samples containing auxiliary CoO; FIG. 18 is a curve diagram showing change with time in the resonance frequency and FIG. 19 is a curve diagram showing change with time in the electro-mechanical coupling coefficient;

FIG. 20 is a curve diagram of piezoelectric properties where the proportions of $Pb(Cd_{1/3}\cdot Nb_{2/3})O_3$, $PbTiO_3$ and $PbZrO_3$ are varied with that of $Bi_2O_3$ unchanged;

FIG. 21 is a curve diagram of piezoelectric properties where the proportions of $PbTiO_3$ and $PbZrO_3$ are varied with those of $Pb(Cd_{1/3}\cdot Nb_{2/3})O_3$ and auxiliary $La_2O_3$ unchanged;

FIGS. 22 and 23 represent the piezoelectric properties of two samples of the invention containing auxiliary $La_2O_3$; FIG. 22 is a curve diagram of the relationship of temperature and dielectric constant and FIG. 23 is a curved diagram of the relationship of temperature and electro-mechanical coupling coefficient;

FIG. 24 is a curve diagram showing change with time in the resonance frequency after polarization as associated with two samples of the invention only consisting of the basic constituent and two other samples containing $La_2O_3$ as an auxiliary component;

FIG. 25 is a curve diagram showing change with time in the electro-mechanical coupling coefficient as associated with the four samples of FIG. 24;

FIG. 26 is a comparative curve diagram showing the temperature characteristics of the resonance frequency after polarization as associated with two samples of the invention respectively involving $La_2O_3$ alone and a mixture of $La_2O_3$ and $Bi_2O_3$ as auxiliary components and one sample of the prior art;

FIG. 27 is a curve diagram of piezoelectric properties where the proportions of $Pb(Cd_{1/3}\cdot Nb_{2/3})O_3$, $PbTiO_3$ and $PbZrO_3$ are varied with that of auxiliary $ThO_2$ fixed;

FIG. 28 is a curve diagram of piezoelectric properties where the proportions of $PbTiO_3$ and $PbZrO_3$ are varied with those of $Pb(Cd_{1/3}\cdot Nb_{2/3})O_3$ and auxiliary $CeO_2$ unchanged;

FIGS. 29 and 30 indicate the piezoelectric properties of two samples of the invention containing auxiliary $ThO_2$; FIG. 29 is a curve diagram of the relationship of temperature and dielectric constant and FIG. 30 is a curve diagram of the relationship of temperature and electro-mechanical coupling coefficient;

FIG. 31 is a curve diagram showing change with time after polarization in the resonance frequency as associated with two samples of the invention consisting of the basic constituent and two other samples containing auxiliary $CeO_2$ and $ThO_2$ respectively;

FIG. 32 is a curve diagram showing change with time in the electro-mechanical coupling coefficient as associated with the four samples of FIG. 31; and FIG. 33 is a comparative curve diagram showing the temperature characteristics of the resonance frequency after polarization as associated with two samples of the invention containing auxiliary $ThO_2$ and two samples of the prior art.

The oxide piezoelectric material of the present invention is newly prepared by solid phase reaction from a plurality of oxides having different valencies, and consists of a ternary oxide system $$Pb(Cd_{1/3}\cdot Nb_{2/3})O_3\text{-}PbTiO_3\text{-}PbZrO_3$$

obtained by substituting part of $PbTiO_3$-$PbZrO_3$ with a novel component of $Pb(Cd_{1/3}\cdot Nb_{2/3})O_3$ which is of perovskite crystal structure. The piezoelectric material of the invention may be expressed as $$x\cdot Pb(Cd_{1/3}\cdot Nb_{2/3})O_3\text{-}y\cdot PbTiO_3\text{-}z\cdot PbZrO_3$$

where:

$x$=50.0 to 1.0 mol. percent
$y$=34.0 to 55.5 mol percent
$z$=16.0 to 53.5 mol percent There will now be described the aforementioned novel component of $Pb(Cd_{1/3}\cdot Nb_{2/3})O_3$. With respect to this material, literature (Soviet Physics Doklady, vol. 9, No. 9, pp. 751–752, 1965) by Venevtsev et al. of Soviet Union discloses that it may be synthesized. However, said report makes no reference to the electrical properties, crystal structure and other properties. The present inventors' studies show that $Pb(Cd_{1/3}\cdot Nb_{2/3})O_3$ is of perovskite crystal structure wherein the lattice constant $a$ indicates 4.11 A.

The aforementioned basic constituent of an oxide piezoelectric material can be easily prepared by the ordinary sintering techniques as described below. Raw oxide, for example, PbO, $TiO_2$, $ZrO_2$, $Nb_2O_5$ and CdO are weighed out exactly to the prescribed proportions and mixed in a ball mill or the like. The raw materials used in this case may consist of other substances such as hydroxides, carbonates and oxalates which, upon heating, are converted to oxides. The aforesaid mixture is presintered at a relatively low temperature, for example, 600 to 900° C. and further ground in a ball mill to form conditioned powders. To said powders is added a binder such as water, or polyvinyl alcohol. The mass is molded at a pressure of about 0.2 to 2 ton/cm.$^2$ and sintered at a temperature of about 1100 to 1270° C. Since part of the PbO is likely to be evaporated and scattered, said sintering is conducted in a sealed furnace, preferably maintaining a maximum temperature generally for about 0.5 to 3 hours. Polarization of an oxide piezoelectric material can be effected by a known method of, for example, fitting a pair of electrodes to its both sides and impressing a D.C. field of 20 to 30 kv./cm. thereon for about one hour in a silicone oil at a temperature of about 140 to 160° C. This process easily produces a piezoelectric material which has a different composition from the known product of a binary system of $$PbTiO_3\text{-}PbZrO_3$$

or that consisting of CdO or ZnO added to said system or a ternary system of $Pb(Mg_{1/3}\cdot Nb_{2/3})O_3$-$PPbTiO_3$-$PbZrO_3$ and displays better properties than any of the prior art.

It is for the following reason that $Pb(Cd_{1/3}\cdot Nb_{2/3})O_3$, $PbTiO_3$ and $PbZrO_3$ constituting the oxide piezoelectric material of the present invention have been chosen to assume the aforementioned proportions.

To begin with, if the proportion of $Pb(Cd_{1/3}\cdot Nb_{2/3})O_3$ involved in the basic constituent exceeds 50.0%, then the electro-mechanical coupling coefficient $Kp$ demanded of a piezoelectric material used in practical applications, for example, a pickup or microphone, will fall to below 43%. Again, if said proportion decreases to below 1.0%, then there will be presented difficulties in sintering a dense and mechanically strong piezoelectric material and the electro-mechanical coupling coefficient $Kp$ will also be reduced to 43%, preventing such product from fully meeting industrial requirements. Referring next to $PbTiO_3$, if its proportions rise above 55.5% or decrease to below 34.0%, then the resultant piezoelectric material will not have a large electro-mechanical coupling coefficient $Kp$ nor be capable of preserving substantially unchanging properties regardless of temperature variation and over a long period of time, failing to be fully satisfactorily used in industrial application, for example, an oscillation element for generating supersonic waves. Last, where the proportion of $PbZrO_3$ increases over 53.5% or falls to below 16.0%, then there will result a piezoelectric material which does not have a large electro-mechanical coupling coefficient $Kp$ and consequently is of little use in piezoelectric applications. Accordingly, the proportions of $$Pb(Cd_{1/3}\cdot Nb_{2/3})O_3$$

Figure 1:
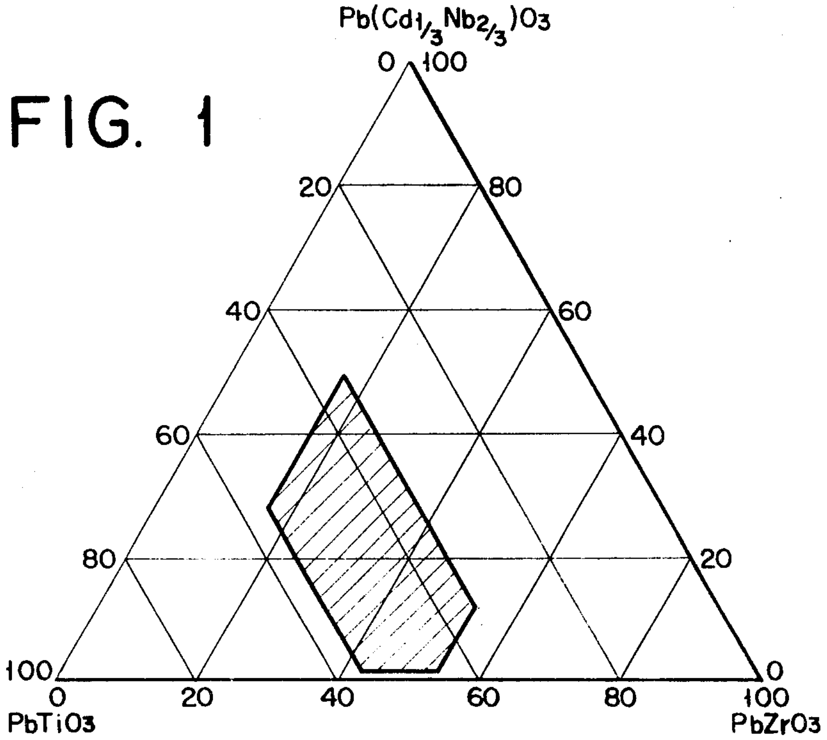
FIG. 1 is a triangular diagram showing the range of composition of a ternary oxide system forming the basic constituent of an oxide piezoelectric material according to the present invention.

$PbTiO_3$ and $PbZrO_3$ forming the ternary basic constituent of the present piezoelectric material are selected from the hatched range of FIG. 1.

The aforementioned oxide piezoelctric material of the present invention assumes the so-called perovskite structure (as determined by X-ray diffraction) in which there are uniformly distributed PbO, $TiO_2$, $ZrO_2$, CdO and $Nb_2O_5$ in the form of solid solution. If expressed by the general formula $ABO_3$, said piezoelectric material comprises divalent Pb represented by A and divalent Cd, pentavalent Nb and tetravalent Ti and Zr represented by B, namely, A and B are respectively formed of a combination of elements having different valencies. In this respect, the piezoelectric material of the present invention is essentially different from that of the prior art which mainly assumes an oxygen-containing octahedron and whose composition is such that if expressed by the general formula $A'B'O_3$, elements represented by B′ are tetravalent when those of A′ are divalent or elements represented by B′ are pentavalent when those of A′ are univalent, namely, A′ and B′ respectively consist of a combination of elements having the same valency.

As already described, the piezoelectric material of the present invention also includes the type consisting of the aforementioned ternary basic constituent assuming the form of a solid solution and an auxiliary component added thereto in a specified proportion such as $MnO_2$, $Cr_2O_3$, NiO, CoO, $La_2O_3$, $Bi_2O_3$, $ThO_2$ or $CeO_2$.

Where the proportion of $MnO_2$ added as an auxiliary component to said basic constituent exceeded 2% by weight, it was found that the mechanical quality factor $Q_M$ of the resultant piezoelectric material was conversely reduced, leading to sufficiently great decrease in its specific resistivity to render the subsequent polarization unsatisfactory, and in consequence the conduction and short circuiting of unnecessary parts during the impression of a D.C. voltage, so that polarization was not fully carried out, making it impossible to improve the mechanical quality factor $Q_M$. Also where the proportion of $MnO_2$ fell to below 0.01%, the mechanical quality factor $Q_M$ was little improved, eventually failing to obtain a piezoelectric material having the desired excellent properties. Accordingly, addition of $MnO_2$ is preferably made within the range of 0.01 to 2.0% by weight. This auxiliary component of $MnO_2$ also acts as a mineralizer to facilitate sintering. Ease of sintering leads to decrease in sintering temperature, thereby suppressing the evaporation of PbO involved in the basic constitutent and eventually producing a dense piezoelectric material.

According to the present invention, addition of auxiliary NiO or CoO alone or in combination to said basic constituent is always limited to the range of 0.1 to 2.5% by weight. Following is the reason. Where the proportion of NiO increases over 2.5% by weight, the $Q_M$ of the resultant piezoelectric material is conversely reduced, leading to sufficiently great decrease in its specific resistivity to render the subsequent polarization unsatisfactory and in consequence the conduction and short circuiting of unnecessary parts during the impression of a D.C. voltage, so that polarization is not fully carried out, making it impossible to improve $Q_M$. Also where addition of NiO falls to below 0.1% by weight, $Q_M$ is not much elevated. NiO, CoO or a mixture thereof also acts as a mineralizer to facilitate sintering. Ease of sintering leads to decrease in sintering temperature, thereby not only supressing the evaporation of PbO involved in the basic constituent and producing a dense piezoelectric material but also elevating $Kp$ to 45 to 70% and $Q_M$ excellent to 250 to 2000. Accordingly, this piezoelectric material fully meets the requirements of practical applications, for example, a transducer like a pickup, microphone, or oscillator or an ignition element.

Furthermore, an oxide piezoelectric material containing NiO or CoO according to the present invention varies very little in its piezoelectric properties with respect to temperature change, for example, from −50 to 200° C. and during a long period of time after polarization, namely, the product always maintains good stable properties and exhibits a prescribed performance. The fact that the present piezoelectric material displays such good stable properties offers the following advantages when it is put to practical use. For example, where a filter or resonator is prepared from such oxide piezoelectric materials, it presents little variation in frequency over a temperature range of −40 to 80° C. due to its good temperature characteristics and exhibits a prescribed performance. Since it presents little change with time in its properties as shown in FIG. 18, it is available for use over a long period of time. Variation in frequency about 10 years after its preparation only amounts to less than 0.15%. Such a prominent feature has been unrealizable with any piezoelectric material of the prior art.

When $La_2O_3$, $Bi_2O_3$ or a mixture thereof is added to said ternary basic constituent of $$Pb(Cd_{1/3}\cdot Nb_{2/3})O_3\text{-}PbTiO_3\text{-}PbZrO_3$$

in a proportion exceeding 3.0 parts by weight per 100 parts by weight of said basic constituent, there occurs the inconvenience that the resultant piezoelectric material conversely decreases in $Q_M$ and in consequence in its specific resistivity, making it impossible fully to carry out polarization. Also where said proportion falls to below 0.1 part by weight, $Q_M$ will be little elevated, failing to obtain a piezoelectric material having the desired excellent properties. Accordingly, addition of auxiliary $La_2O_3$ should always be limited to the range of 0.1 to 3.0 parts by weight. On the other hand, said auxiliary $La_2O_3$ or $Bi_2O_3$ acts as a mineralizer to facilitate sintering and decrease sintering temperature. The oxide piezoelectric material of this embodiment which has an essentially different composition from the conventional product not only displays excellent piezoelectric properties but also presents little change in said properties with respect to temperature variation and over a long period of time, always exhibiting a prescribed performance. Let us take an example, while a ceramic filter prepared from a piezoelectric material of the known $PbTiO_3$-$PbZrO_3$ system presents a variation of ±0.3% in the central frequency over a temperature range of −40 to 60° C., a similar filter involving the oxide piezoelectric material of the present invention only indicates a variation of ±0.1% at most under the same conditions. To give a further example, a filter of 455 kHz. for a transistor prepared from the present piezoelectric material only indicates a variation of ±0.45 kHz. in the central frequency over a temperature range of −40 to 60° C. and 0.1 to 0.2 kHz. in said frequency during a period of 10,000 hours after polarization, whereas a similar filter involving a piezoelectric material of the known $PbTiO_3$-$PbZrO_3$ system presents a variation of 1.33 kHz. in said frequency under the same temperature condition and a variation of 0.5 to 1 kHz. during the same period. Such extremely stable properties of the present piezoelectric material assume particular importance when it is employed as a ceramic filter or resonator for communication for which there is demanded a rigid specification. Accordingly, the oxide piezoelectric material of the present invention may be deemed of very great practical advantage, because it has good properties (K$p$ generally ranges from about 43 to about 70% and $Q_M$ from about 200 to about 2000), indicates little variation in said properties with respect to temperature change and during a long time after polarization and additionally admits of simple fabrication.

Where the proportion of $ThO_2$, $CeO_2$ or a mixture thereof added as an auxiliary component to said ternary basic constituent of $Pb(Cd_{1/3}\cdot Nb_{2/3})O_3$-$PbTiO_3$-$PbZrO_3$ rises beyond 3.0 parts by weight per 100 parts by weight of said basic constituent, then the resultant piezoelectric material undesirably decreases in $Q_M$ and in consequence in its specific resistivity, making it impossible fully to carry out polarization. In case said proportion is reduced to below 0.1 part by weight, the mechanical quality factor $Q_M$ will be little improved, failing to obtain a piezoelectric material having the desired excellent properties. Accordingly, addition of an auxiliary component of $ThO_2$ is always limited to the range of 0.1 to 3.0 parts by weight. On the other hand, said auxiliary $ThO_2$ or $CeO_2$ also acts as a mineralizer to facilitate sintering. The oxide piezoelectric material of this embodiment has an entirely different composition from the known product and displays not only excellent properties but also presents little variation with respect to temperature change and during a long period after polarization, thus always exhibiting a prescribed performance.

For example, a ceramic filter prepared from the present oxide piezoelectric material only indicates a variation of ±0.1% at most in the center frequency over a temperature range of −40 to 80° C., whereas a similar filter involving a piezoelectric material of the conventional $PbTiO_3$-$PbZrO_3$ system varies to an extent of ±0.3% in said frequency under the same temperature condition. Further, a filter of 455 kHz. for a transistor using the piezoelectric material of the present invention containing $ThO_2$ or $CeO_2$ as an auxiliary component only indicates a variation of ±0.45 kHz. in the center frequency over a temperature range of −40 to 80° C. and a variation of about 0.1 to about 0.2 kHz. during 10,000 hours after polarization, whereas a piezoelectric material of the known $PbTiO_3$-$PbZrO_3$ system presents a variation of ±1.33 kHz. in said frequency under the same temperature condition and a variation of about 0.5 to about 1 kHz. during the same period. Such very stable properties of the present piezoelectric material assumes particular importance when it is used as a ceramic filter or resonator for communication for which there is demanded a rigid specification. Accordingly, the oxide piezoelectric material of the present invention may be deemed extremely advantageous in practical application because it has good properties (K$p$ generally stands at about 45 to about 70% and $Q_M$ at about 200 to about 2000), indicates little variation in said properties with respect to temperature change and during a long time after polarization and moreover enables a simple fabrication.

The present invention will be more clearly understood from the examples which follow.

EXAMPLE I

Basic constituent and addition of $MnO_2$ as an auxiliary component to the basic constituent (including comparative examples)

$MnO_2$ in amounts of 0.01–3.0 percent by weight were added to the basic constituents.

Samples of all the components were prepared in the following manner. PbO, $TiO_2$, $ZrO_2$, CdO, $Nb_2O_5$ and, where required, $MnO_2$ were weighed out exactly to a prescribed proportion. They were fully mixed in a ball mill, presintered at a temperature of 850° C., further ground similarly in a ball mill. There were prepared 79 samples of conditioned powders including those for comparative purposes. Said powders to which there was added polyvinyl alcohol as a binder were molded at a pressure of 1 ton/cm.$^2$ and sintered in a sealed furnace by setting a maximum temperature at 1100° C. to 1280° C. and maintaining the mass at said temperature for one hour, obtaining disks each about 13 mm. in diameter and 1 mm. thick. Said 79 samples including comparative samples prepared in the aforementioned manner were determined for density $d$ at a temperature of 23° C. Each sample disk was polarized by fitting a pair of electrodes to both sides, applying a D.C. field thereto one hour in a silicone oil at a temperature of 140° C. Determination was made of the piezoelectric properties of each polarized sintered body by the standard circuit method disclosed in Proc. IRE, vol. 137, pp. 1378–1395, 1949; vol. 145, pp. 353–358, 1957; and vol. 146, pp. 765–778, 1958. The dielectric constant of each sample was also determined by the customary process. Table 1 below presents the relationship of the proportions of the respective components of each sintered sample versus the sintering temperature, density, dielectric constant and piezoelectric properties.

The characters used in Table 1 are intended to mean the following:

FT=sintering temperature (° C.)
$d$=density measured at 23° C.
$\epsilon$=dielectric constant measured at 1 kc./s., 23° C.
K$p$=electro-mechanical coupling coefficient
$Q_M$=mechanical quality factor In Table 1, "Comp." is used as an abreviation of "Comparative Example."

TABLE 1

| Sample No. | Basic constituent (mol percent) PbTiO$_3$ | PbZrO$_3$ | Pb(Cd$_{1/3}$ Nb$_{2/3}$)O$_3$ | Auxiliary component (percent by weight) MnO$_2$ | FT | d | ε | Kp | $Q_M$ |
|---|---|---|---|---|---|---|---|---|---|
| Comp.: | | | | | | | | | |
| 1 | 60.0 | 40.0 | 0 | 0 | 1,280 | 7.41 | 853 | 38.6 | 198 |
| 2 | 60.0 | 30.0 | 10.0 | 0 | 1,280 | 7.43 | 906 | 40.3 | 156 |
| 3 | 60.0 | 20.0 | 20.0 | 0 | 1,250 | 7.40 | 764 | 39.2 | 275 |
| Example: | | | | | | | | | |
| 1 | 55.5 | 43.5 | 1.0 | 0 | 1,280 | 7.43 | 806 | 43.0 | 175 |
| 2 | 55.5 | 43.5 | 1.0 | 1.0 | 1,270 | 7.56 | 857 | 45.7 | 334 |
| Comp. 3*a* | 55.0 | 45.0 | 0 | 0 | 1,280 | 7.44 | 831 | 42.9 | 250 |
| Example: | | | | | | | | | |
| 4 | 55.0 | 44.0 | 1.0 | 0 | 1,280 | 7.46 | 925 | 43.8 | 182 |
| 5 | 55.0 | 44.0 | 1.0 | 0.01 | 1,280 | 7.52 | 940 | 45.4 | 286 |
| 6 | 55.0 | 44.0 | 1.0 | 0.5 | 1,270 | 7.55 | 974 | 46.3 | 380 |
| 7 | 55.0 | 44.0 | 1.0 | 1.5 | 1,260 | 7.51 | 933 | 46.0 | 294 |
| 8 | 55.0 | 44.0 | 1.0 | 2.0 | 1,250 | 7.50 | 912 | 45.3 | 347 |
| 9 | 55.0 | 40.0 | 5.0 | 0.3 | 1,250 | 7.56 | 1,022 | 46.6 | 401 |
| 10 | 55.0 | 40.0 | 5.0 | 1.2 | 1,240 | 7.55 | 1,076 | 46.8 | 395 |
| 11 | 55.0 | 30.0 | 15.0 | 0.3 | 1,240 | 7.52 | 1,220 | 47.1 | 482 |
| 12 | 55.0 | 30.0 | 15.0 | 1.2 | 1,230 | 7.54 | 1,163 | 46.7 | 514 |
| 13 | 55.0 | 20.0 | 25.0 | 0.3 | 1,220 | 7.58 | 1,284 | 46.2 | 576 |
| 14 | 55.0 | 20.0 | 25.0 | 1.2 | 1,210 | 7.56 | 1,205 | 45.9 | 496 |
| 15 | 48.0 | 50.0 | 2.0 | 0 | 1,260 | 7.47 | 722 | 47.4 | 226 |
| 16 | 48.0 | 50.0 | 2.0 | 0.02 | 1,260 | 7.52 | 861 | 49.6 | 443 |
| 17 | 48.0 | 50.0 | 2.0 | 1.0 | 1,240 | 7.58 | 908 | 51.2 | 669 |
| 18 | 48.0 | 45.0 | 7.0 | 0 | 1,250 | 7.54 | 1,142 | 54.8 | 160 |
| 19 | 48.0 | 45.0 | 7.0 | 0.2 | 1,250 | 7.59 | 1,181 | 56.3 | 332 |
| 20 | 48.0 | 45.0 | 7.0 | 1.2 | 1,230 | 7.64 | 1,212 | 60.9 | 983 |
| 21 | 48.0 | 45.0 | 7.0 | 1.5 | 1,220 | 7.56 | 1,156 | 57.7 | 644 |
| 22 | 48.0 | 45.0 | 7.0 | 2.0 | 1,210 | 7.54 | 1,163 | 55.7 | 491 |
| 23 | 48.0 | 40.0 | 12.0 | 0 | 1,220 | 7.62 | 1,340 | 58.1 | 123 |
| 24 | 48.0 | 40.0 | 12.0 | 0.5 | 1,210 | 7.64 | 1,396 | 62.2 | 848 |
| 25 | 48.0 | 40.0 | 12.0 | 0.8 | 1,200 | 7.72 | 1,289 | 67.2 | 1,640 |
| 26 | 48.0 | 40.0 | 12.0 | 1.0 | 1,200 | 7.73 | 1,302 | 65.1 | 2,040 |
| 27 | 48.0 | 40.0 | 12.0 | 1.5 | 1,190 | 7.68 | 1,273 | 60.6 | 1,375 |
| 28 | 48.0 | 30.0 | 22.0 | 0 | 1,200 | 7.52 | 1,648 | 52.9 | 167 |
| 29 | 48.0 | 30.0 | 22.0 | 0.5 | 1,190 | 7.59 | 1,722 | 62.7 | 775 |
| 30 | 48.0 | 30.0 | 22.0 | 1.4 | 1,180 | 7.52 | 1,613 | 58.8 | 596 |
| 31 | 48.0 | 20.0 | 32.0 | 0 | 1,180 | 7.50 | 1,849 | 50.3 | 247 |
| 32 | 48.0 | 20.0 | 32.0 | 0.5 | 1,170 | 7.52 | 1,896 | 56.4 | 688 |
| 33 | 48.0 | 20.0 | 32.0 | 1.0 | 1,160 | 7.56 | 1,718 | 61.4 | 895 |
| 34 | 43.0 | 52.0 | 5.0 | 0 | 1,200 | 7.48 | 1,276 | 49.3 | 211 |
| 35 | 43.0 | 52.0 | 5.0 | 0.5 | 1,190 | 7.53 | 1,350 | 52.0 | 481 |
| 36 | 43.0 | 52.0 | 5.0 | 1.0 | 1,190 | 7.51 | 1,261 | 60.8 | 729 |
| 37 | 43.0 | 52.0 | 5.0 | 1.5 | 1,180 | 7.48 | 1,224 | 52.2 | 583 |
| 38 | 43.0 | 42.0 | 15.0 | 0 | 1,180 | 7.54 | 1,535 | 47.9 | 196 |
| 39 | 43.0 | 42.0 | 15.0 | 0.5 | 1,170 | 7.60 | 1,603 | 51.6 | 429 |
| 40 | 43.0 | 42.0 | 15.0 | 1.0 | 1,170 | 7.62 | 1,668 | 59.1 | 932 |
| 41 | 43.0 | 42.0 | 15.0 | 1.5 | 1,160 | 7.58 | 1,560 | 53.4 | 638 |
| 42 | 43.0 | 32.0 | 25.0 | 0 | 1,160 | 7.50 | 1,918 | 47.0 | 201 |
| 43 | 43.0 | 32.0 | 25.0 | 0.5 | 1,160 | 7.55 | 1,983 | 50.8 | 436 |
| 44 | 43.0 | 32.0 | 25.0 | 1.0 | 1,150 | 7.58 | 2,020 | 56.7 | 802 |
| 45 | 43.0 | 32.0 | 25.0 | 1.5 | 1,150 | 7.54 | 1,901 | 53.3 | 522 |
| 46 | 43.0 | 22.0 | 35.0 | 0 | 1,150 | 7.42 | 1,483 | 45.8 | 163 |
| 47 | 43.0 | 22.0 | 35.0 | 0.5 | 1,140 | 7.47 | 1,509 | 48.3 | 318 |
| 48 | 43.0 | 22.0 | 35.0 | 1.0 | 1,140 | 7.49 | 1,476 | 52.4 | 911 |
| 49 | 43.0 | 22.0 | 35.0 | 1.5 | 1,130 | 7.43 | 1,418 | 50.2 | 576 |
| Comp.: | | | | | | | | | |
| 50 | 43.0 | 12.0 | 45.0 | 0 | 1,130 | 7.39 | 1,116 | 45.0 | 243 |
| 51 | 43.0 | 12.0 | 45.0 | 0.5 | 1,130 | 7.44 | 1,181 | 48.2 | 446 |
| 52 | 43.0 | 12.0 | 45.0 | 1.0 | 1,120 | 7.47 | 1,163 | 51.1 | 738 |
| 53 | 43.0 | 12.0 | 45.0 | 1.5 | 1,120 | 7.41 | 1,128 | 50.3 | 534 |
| 53*a* | 38.0 | 60.0 | 2.0 | 0 | 1,240 | 7.36 | 1,385 | 39.4 | 237 |
| 53*b* | 39.5 | 55.5 | 5.0 | 0 | 1,230 | 7.44 | 1,284 | 43.2 | 210 |
| 53*c* | 39.5 | 55.5 | 5.0 | 1.0 | 1,230 | 7.52 | 1,300 | 47.4 | 493 |
| Example: | | | | | | | | | |
| 54 | 38.0 | 53.0 | 9.0 | 0 | 1,220 | 7.45 | 1,241 | 43.8 | 195 |
| 55 | 38.0 | 53.0 | 9.0 | 0.5 | 1,210 | 7.51 | 1,185 | 47.2 | 359 |
| 56 | 38.0 | 53.0 | 9.0 | 1.0 | 1,210 | 7.53 | 1,110 | 50.5 | 588 |
| 57 | 38.0 | 53.0 | 9.0 | 1.5 | 1,200 | 7.50 | 1,094 | 48.8 | 441 |
| 58 | 38.0 | 43.0 | 19.0 | 0 | 1,200 | 7.43 | 1,330 | 46.7 | 213 |
| 59 | 38.0 | 43.0 | 19.0 | 0.5 | 1,200 | 7.49 | 1,399 | 50.7 | 449 |
| 60 | 38.0 | 43.0 | 19.0 | 1.0 | 1,200 | 7.54 | 1,410 | 52.6 | 639 |
| 61 | 38.0 | 43.0 | 19.0 | 1.5 | 1,180 | 7.47 | 1,312 | 50.1 | 492 |
| 62 | 38.0 | 33.0 | 29.0 | 0 | 1,170 | 7.56 | 1,032 | 47.6 | 166 |
| 63 | 38.0 | 33.0 | 29.0 | 0.5 | 1,170 | 7.60 | 1,088 | 52.4 | 617 |
| 64 | 38.0 | 33.0 | 29.0 | 1.0 | 1,160 | 7.52 | 1,003 | 54.5 | 882 |
| 65 | 38.0 | 33.0 | 29.0 | 1.5 | 1,160 | 7.50 | 1,031 | 50.3 | 401 |
| 66 | 38.0 | 23.0 | 39.0 | 0 | 1,140 | 7.36 | 956 | 44.4 | 181 |
| 67 | 38.0 | 23.0 | 39.0 | 0.5 | 1,140 | 7.41 | 982 | 47.2 | 353 |
| 68 | 38.0 | 23.0 | 39.0 | 1.5 | 1,130 | 7.43 | 964 | 46.7 | 394 |
| 69 | 38.0 | 18.0 | 44.0 | 0 | 1,120 | 7.30 | 718 | 43.8 | 208 |
| 70 | 38.0 | 18.0 | 44.0 | 0.5 | 1,120 | 7.38 | 773 | 46.3 | 358 |
| 71 | 38.0 | 18.0 | 44.0 | 1.0 | 1,100 | 7.36 | 814 | 48.5 | 406 |
| 72 | 38.0 | 18.0 | 44.0 | 1.5 | 1,100 | 7.35 | 806 | 47.8 | 336 |
| Comp. 72*a* | 38.0 | 18.0 | 44.0 | 3.0 | 1,100 | 7.26 | 781 | 42.9 | 283 |
| Example: | | | | | | | | | |
| 73 | 34.0 | 16.0 | 50.0 | 0 | 1,100 | 7.35 | 705 | 43.1 | 245 |
| 74 | 34.0 | 16.0 | 50.0 | 0.5 | 1,090 | 7.41 | 742 | 44.3 | 354 |
| 75 | 34.0 | 16.0 | 50.0 | 1.0 | 1,090 | 7.42 | 751 | 45.5 | 421 |
| 76 | 34.0 | 16.0 | 50.0 | 1.5 | 1,090 | 7.40 | 733 | 43.9 | 372 |
| 77 | 34.0 | 16.0 | 50.0 | 2.0 | 1,090 | 7.38 | 726 | 43.3 | 295 |

Figure 2:
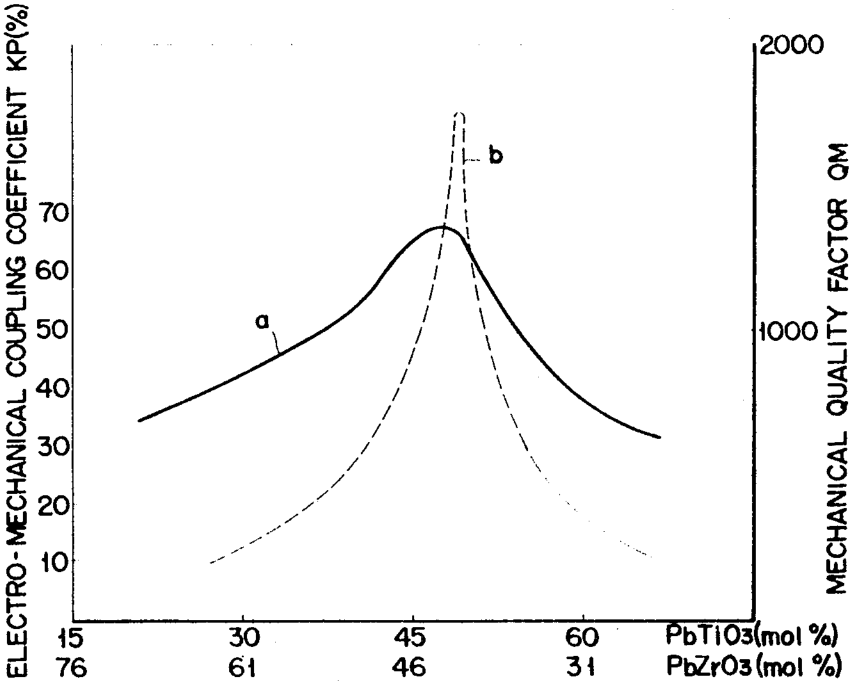
FIG. 2 is a curve diagram of piezoelectric properties where the proportions of $PbTiO_3$ and $PbZrO_3$ are varied with those of $Pb(Cd_{1/3}\cdot Nb_{2/3})O_3$ and $MnO_2$ fixed.
Figure 3:
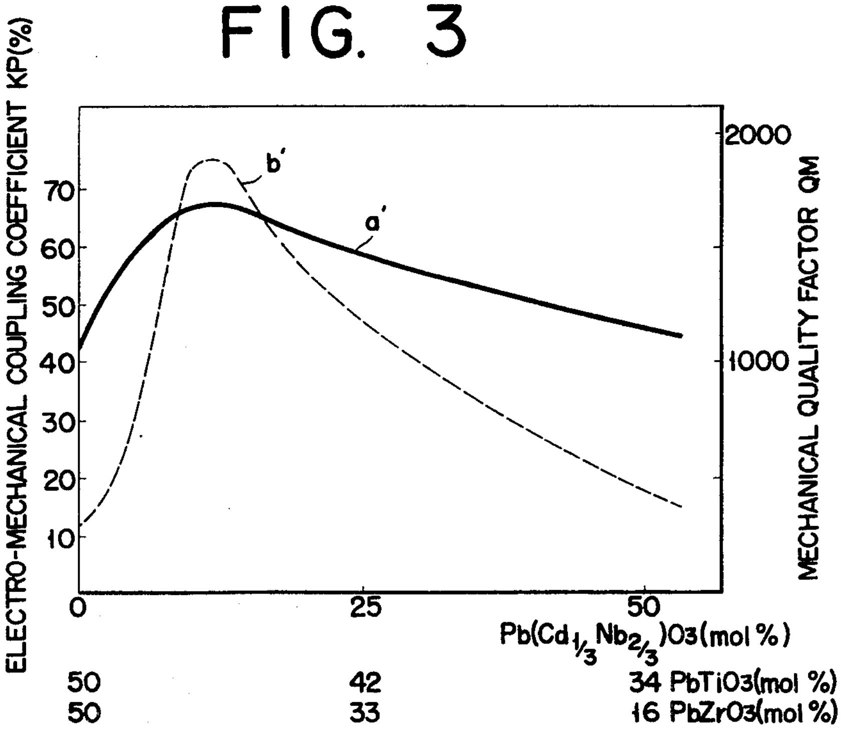
FIG. 3 is a curve diagram of piezoelectric properties where the proportions of $Pb(Cd_{1/3}\cdot Nb_{2/3})O_3$, $PbTiO_3$ and $PbZrO_3$ constituting the ternary oxide system of the basic constitutent are varied with that of auxiliary $MnO_2$ unchanged.

Further for better understanding of variations in the electro-mechanical coupling coefficient K*p* and mechanical quality factor $Q_M$ according to changes in the composition of an oxide piezoelectric material of the present invention, the proportions of $PbTiO_3$ and $PbZrO_3$ were varied with addition of auxiliary $MnO_2$ fixed at 0.7% by weight and the proportion of $Pb(Cd_{1/3}\cdot Nb_{2/3})O_3$ fixed at 9.0 mol percent, changes in the piezoelectric properties being presented in FIG. 2. In this figure, curve *a* denotes changes in the electro-mechanical coupling coefficient K*p* and curve *b* those in the mechanical quality factor $Q_M$. Also proportions of $Pb(Cd_{1/3}\cdot Nb_{2/3})O_3$, $PbTiO_3$ and $PbZrO_3$ were changed with addition of auxiliary $MnO_2$ fixed at 0.6% by weight to determine variations in the piezoelectric properties, the results being indicated in FIG. 3. In this figure, curve *a* represents variations in the electro-mechanical coupling coefficient K*p* and curve *b* those in the mechanical quality factor $Q_M$.

Figure 4:
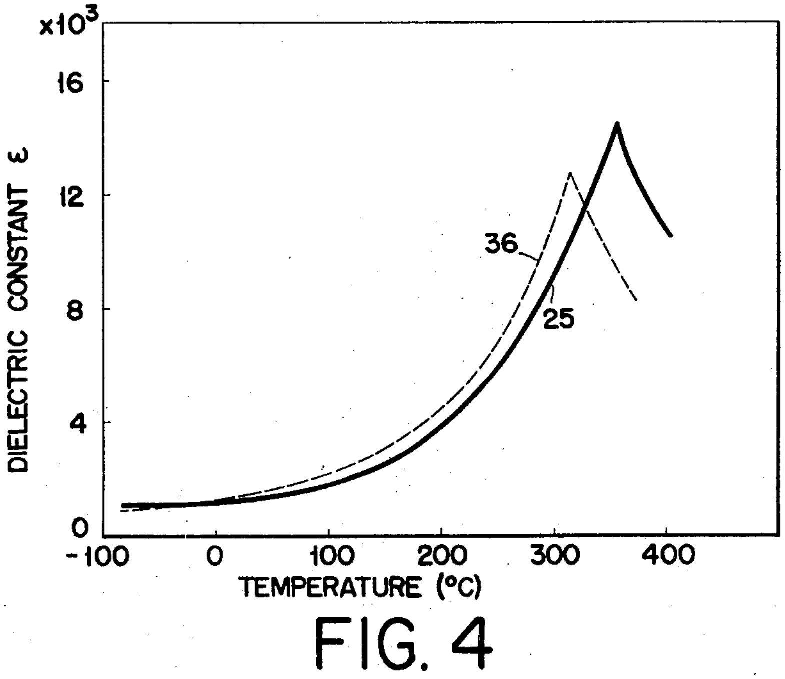
FIGS. 4 and 5 are curve diagrams showing the relationship of the dielectric constant and electro-mechanical coupling coefficient with respect to temperature variation as associated with two samples of the present invention containing $MnO_2$ as an auxiliary component.
Figure 5:
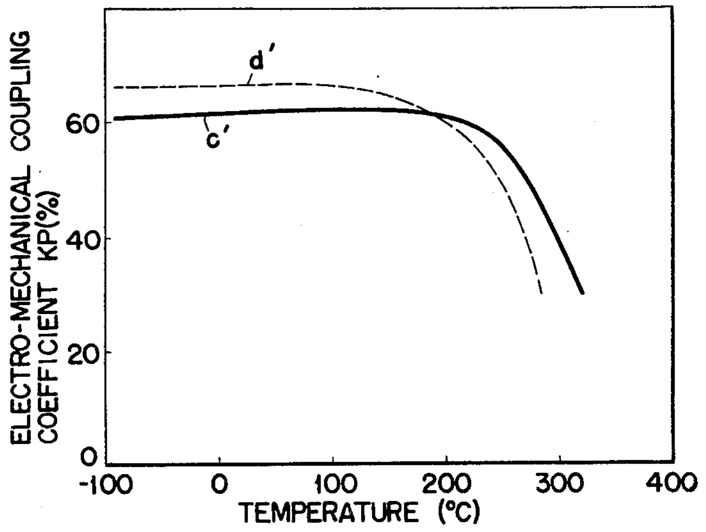

On the other hand, determination was made of variations in the dielectric constant according to temperature changes in connection with Examples 25 and 36 among those listed in Table 1 above, showing that said examples had a tendency of variations illustrated in FIG. 4. Both examples indicated high Curie points of 350° C. and 310° C. respectively. In FIG. 4, curves 25 and 26 denote Examples 25 and 26 respectively. Both examples varied little as shown in FIG. 5 in the electro-mechanical coupling coefficient K*p* according to temperature changes due to their high Curie points over a temperature range of −60° to +200° C., proving that they had a stable, fully high electro-mechanical coupling coefficient. In FIG. 5, curves 25′ and 36′ represent Examples 25 and 36 respectively.

Figure 6:
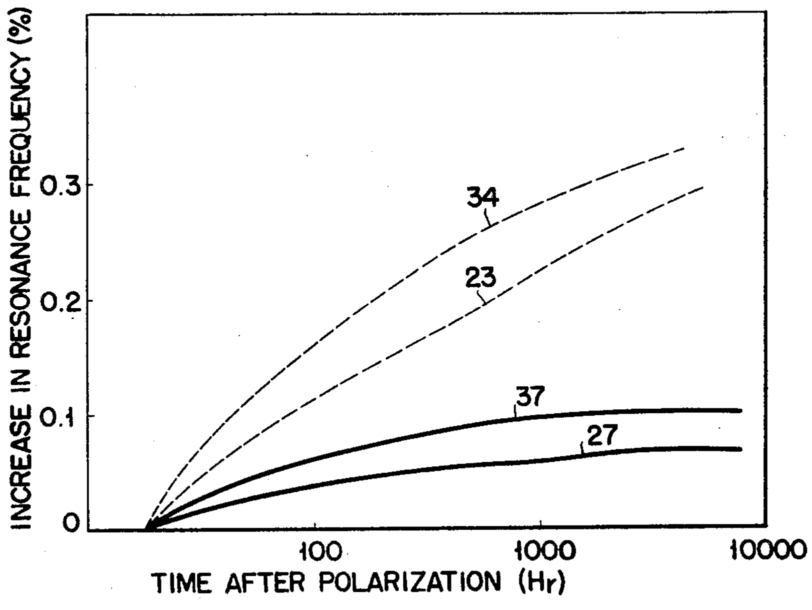
FIGS. 6 and 7 are curve diagrams showing increase in the resonance frequency and decrease in the electro-mechanical coupling coefficient after polarization as associated with other samples of the invention similarly containing $MnO_2$ as an auxiliary component.
Figure 7:
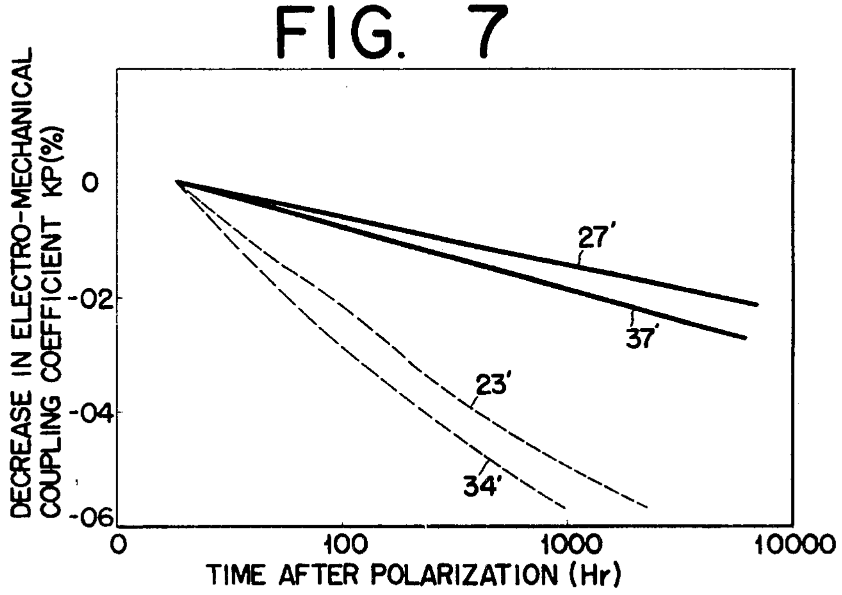

FIGS. 6 and 7 show change with time in the resonance frequency *fr* and the electro-mechanical coupling coefficient K*p* in the diametrical direction. As seen from these figures, a piezoelectric material containing $MnO_2$ is more improved with respect to change with time in its properties than that lacking said auxiliary component, showing that addition of $MnO_2$ makes the product more adapted for use in a filter. In FIG. 6, curves 27 and 37 denote change with time in the resonance frequency of Examples 27 and 37, and curves 23 and 34 similar changes in Examples 23 and 34. In FIG. 7, curves 27′ and 37′ represent change with time in the electro-mechanical coupling coefficient K*p* of Examples 27 and 37, and curves 23′ and 34′ similar change in Examples 23 and 34.

EXAMPLE II

Addition of $Cr_2O_3$ as an auxiliary component to the basic constituent (including comparative examples)

There was added an auxiliary component of $Cr_2O_3$ to the basic constituent of $$Pb(Cd_{1/3}\cdot Nb_{2/3})O_3\text{-}PbTiO_3\text{-}PbZrO_3$$

in amounts of 0.05 to 2.0% by weight. There were prepared 59 samples of this example and one comparative example in the same manner as in Example 1. The compositions and properties of these samples are shown in Table 2 below.

TABLE 2

| Sample No. | Basic constituent (mol percent) | | | Auxiliary component (percent by weight) | | | | | |
|---|---|---|---|---|---|---|---|---|---|
| | $PbTiO_3$ | $PbZrO_3$ | $Pb(Cd_{1/3}Nb_{2/3})O_3$ | $Cr_2O_3$ | FT | *d* | ε | K*p* | $Q_M$ |
| Example: | | | | | | | | | |
| 80 | 55.5 | 43.5 | 1.0 | 1.0 | 1,270 | 7.52 | 864 | 45.2 | 367 |
| 81 | 55.0 | 44.0 | 1.0 | 0.07 | 1,280 | 7.50 | 950 | 45.0 | 350 |
| 82 | 55.0 | 44.0 | 1.0 | 0.05 | 1,270 | 7.52 | 970 | 45.4 | 301 |
| 83 | 55.0 | 44.0 | 1.0 | 1.0 | 1,260 | 7.55 | 934 | 48.0 | 408 |
| 84 | 55.0 | 44.0 | 1.0 | 1.5 | 1,250 | 7.53 | 925 | 46.7 | 322 |
| 85 | 55.0 | 44.0 | 1.0 | 2.0 | 1,250 | 7.50 | 912 | 45.3 | 294 |
| 86 | 55.0 | 40.0 | 5.0 | 0.6 | 1,250 | 7.56 | 1,022 | 46.5 | 406 |
| 87 | 55.0 | 40.0 | 5.0 | 1.2 | 1,240 | 7.60 | 1,071 | 47.2 | 513 |
| 88 | 55.0 | 40.0 | 5.0 | 1.8 | 1,240 | 7.51 | 1,045 | 46.8 | 366 |
| 89 | 55.0 | 30.0 | 15.0 | 0.6 | 1,240 | 7.52 | 1,234 | 47.1 | 489 |
| 90 | 55.0 | 30.0 | 15.0 | 1.2 | 1,220 | 7.62 | 1,165 | 48.2 | 631 |
| 91 | 55.0 | 20.0 | 25.0 | 0.6 | 1,230 | 7.49 | 1,280 | 46.2 | 512 |
| 92 | 55.0 | 20.0 | 25.0 | 1.2 | 1,220 | 7.54 | 1,206 | 47.1 | 585 |
| 93 | 48.0 | 50.0 | 2.0 | 0.8 | 1,250 | 7.52 | 879 | 49.6 | 493 |
| 94 | 48.0 | 50.0 | 2.0 | 1.6 | 1,240 | 7.46 | 907 | 48.3 | 674 |
| 95 | 48.0 | 45.0 | 7.0 | 0.1 | 1,250 | 7.58 | 1,188 | 56.6 | 351 |
| 96 | 48.0 | 45.0 | 7.0 | 1.0 | 1,230 | 7.63 | 1,226 | 60.7 | 967 |
| 97 | 48.0 | 45.0 | 7.0 | 1.5 | 1,220 | 7.55 | 1,173 | 57.1 | 712 |
| 98 | 48.0 | 45.0 | 7.0 | 2.0 | 1,210 | 7.51 | 1,148 | 55.5 | 638 |
| 99 | 48.0 | 40.0 | 12.0 | 0.5 | 1,210 | 7.60 | 1,384 | 60.7 | 846 |
| 100 | 48.0 | 40.0 | 12.0 | 0.8 | 1,200 | 7.71 | 1,261 | 65.3 | 1,475 |
| 101 | 48.0 | 40.0 | 12.0 | 1.0 | 1,200 | 7.75 | 1,240 | 66.4 | 2,033 |
| 102 | 48.0 | 40.0 | 12.0 | 1.6 | 1,190 | 7.64 | 1,273 | 64.1 | 1,321 |
| 103 | 48.0 | 30.0 | 22.0 | 0.5 | 1,190 | 7.57 | 1,734 | 62.5 | 758 |
| 104 | 48.0 | 30.0 | 22.0 | 1.4 | 1,180 | 7.53 | 1,602 | 58.2 | 564 |
| 105 | 48.0 | 20.0 | 32.0 | 0.5 | 1,170 | 7.52 | 1,878 | 57.4 | 685 |
| 106 | 48.0 | 20.0 | 32.0 | 1.0 | 1,160 | 7.56 | 1,761 | 62.9 | 899 |
| 107 | 48.0 | 20.0 | 32.0 | 1.5 | 1,160 | 7.53 | 1,742 | 59.7 | 746 |
| 108 | 43.0 | 52.0 | 5.0 | 0.5 | 1,190 | 7.51 | 1,367 | 52.0 | 493 |
| 109 | 43.0 | 52.0 | 5.0 | 1.0 | 1,180 | 7.53 | 1,350 | 61.1 | 760 |
| 110 | 43.0 | 52.0 | 5.0 | 1.5 | 1,180 | 7.49 | 1,298 | 53.4 | 536 |
| 111 | 43.0 | 42.0 | 15.0 | 0.5 | 1,170 | 7.60 | 1,631 | 51.2 | 438 |
| 112 | 43.0 | 42.0 | 15.0 | 1.0 | 1,170 | 7.62 | 1,674 | 59.7 | 905 |
| 113 | 43.0 | 42.0 | 15.0 | 1.5 | 1,160 | 7.58 | 1,576 | 53.6 | 591 |
| 114 | 43.0 | 32.0 | 25.0 | 0.5 | 1,160 | 7.56 | 1,972 | 50.6 | 443 |
| 115 | 43.0 | 32.0 | 25.0 | 1.0 | 1,150 | 7.59 | 2,060 | 56.3 | 800 |
| 116 | 43.0 | 32.0 | 25.0 | 1.5 | 1,150 | 7.53 | 1,943 | 53.5 | 546 |
| 117 | 43.0 | 22.0 | 35.0 | 0.5 | 1,140 | 7.51 | 1,509 | 48.4 | 372 |
| 118 | 43.0 | 22.0 | 35.0 | 1.4 | 1,130 | 7.48 | 1,431 | 49.7 | 547 |
| Comp.: | | | | | | | | | |
| 119 | 43.0 | 12.0 | 45.0 | 0.5 | 1,130 | 7.46 | 1,180 | 48.6 | 461 |
| 120 | 43.0 | 12.0 | 45.0 | 1.0 | 1,120 | 7.47 | 1,142 | 51.3 | 785 |
| 121 | 43.0 | 12.0 | 45.0 | 1.5 | 1,120 | 7.43 | 1,125 | 50.2 | 536 |
| Example: | | | | | | | | | |
| 122 | 38.0 | 53.0 | 9.0 | 0.5 | 1,210 | 7.50 | 1,181 | 47.4 | 376 |
| 123 | 38.0 | 53.0 | 9.0 | 1.[illegible] | 1,200 | 7.53 | 1,122 | 50.7 | 589 |
| 124 | 38.0 | 53.0 | 9.0 | 1.5 | 1,200 | 7.51 | 1,093 | 48.1 | 400 |
| 125 | 38.0 | 43.0 | 19.0 | 0.5 | 1,190 | 7.45 | 1,372 | 50.9 | 448 |
| 126 | 38.0 | 43.0 | 19.0 | 1.0 | 1,190 | 7.51 | 1,411 | 53.0 | 678 |
| 127 | 38.0 | 43.0 | 19.0 | 1.5 | 1,180 | 7.42 | 1,346 | 49.8 | 382 |
| 128 | 39.5 | 53.5 | 7.0 | 1.0 | 1,220 | 7.51 | 1,232 | 47.8 | 491 |
| 129 | 38.0 | 33.0 | 29.0 | 0.5 | 1,170 | 7.59 | 1,083 | 52.4 | 636 |
| 130 | 38.0 | 33.0 | 29.0 | 1.0 | 1,160 | 7.52 | 1,004 | 54.2 | 863 |
| 131 | 38.0 | 33.0 | 29.0 | 1.5 | 1,160 | 7.50 | 1,061 | 50.0 | 426 |
| 132 | 38.0 | 23.0 | 39.0 | 0.1 | 1,140 | 7.40 | 982 | 46.8 | 354 |
| 133 | 38.0 | 23.0 | 39.0 | 0.5 | 1,130 | 7.46 | 962 | 48.3 | 528 |
| 134 | 38.0 | 23.0 | 39.0 | 1.5 | 1,130 | 7.42 | 908 | 47.5 | 412 |
| 135 | 38.0 | 18.0 | 44.0 | 0.1 | 1,120 | 7.41 | 776 | 46.0 | 367 |
| 136 | 38.0 | 18.0 | 44.0 | 1.0 | 1,110 | 7.46 | 789 | 48.6 | 542 |
| 137 | 38.0 | 18.0 | 44.0 | 1.5 | 1,110 | 7.43 | 811 | 47.2 | 360 |
| Comp. 137*a* | 38.0 | 18.0 | 44.0 | 2.5 | 1,100 | 7.32 | 780 | 42.8 | 287 |
| Example: | | | | | | | | | |
| 138 | 34.0 | 16.0 | 50.0 | 0.5 | 1,100 | 7.40 | 754 | 45.8 | 335 |
| 139 | 34.0 | 16.0 | 50.0 | 1.0 | 1,100 | 7.51 | 792 | 47.0 | 468 |
| 140 | 34.0 | 16.0 | 50.0 | 2.0 | 1,100 | 7.42 | 741 | 43.4 | 381 |

Figure 8:
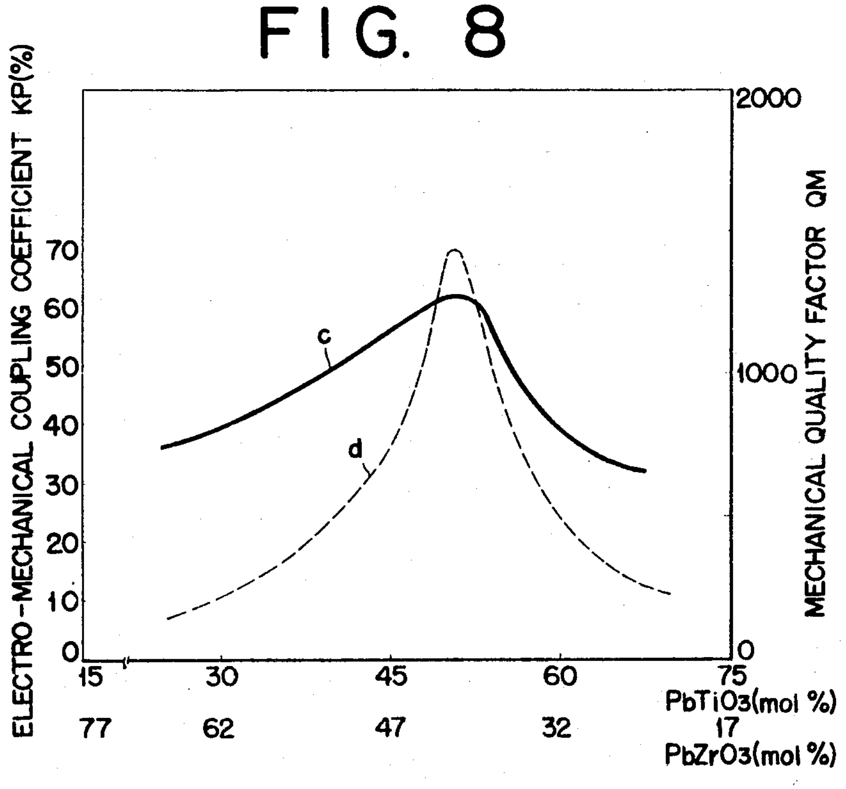
FIG. 8 is a curve diagram showing piezoelectric properties where the proportions of $PbTiO_3$ and $PbZrO_3$ are varied with those of $Pb(Cd_{1/3}\cdot Nb_{2/3})O_3$ and auxiliary $MnO_2$ unchanged.
Figure 9:
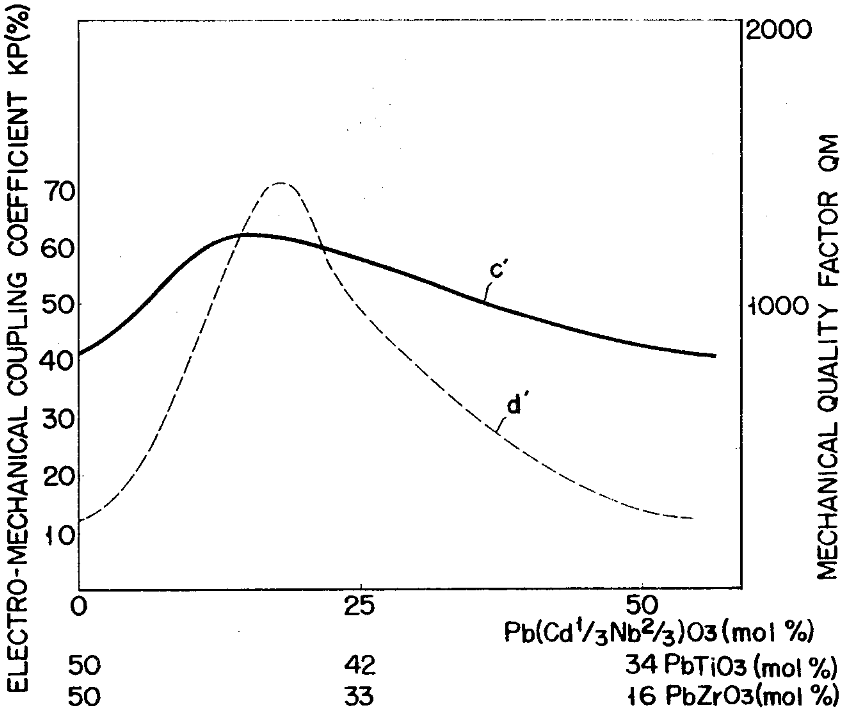
FIG. 9 is a curve diagram showing piezoelectric properties where the proportions of $Pb(Cd_{1/3}\cdot Nb_{2/3})O_3$, $PbTiO_3$ and $PbZrO_3$ are varied with that of auxiliary $Cr_2O_3$ unchanged.
Figure 10:
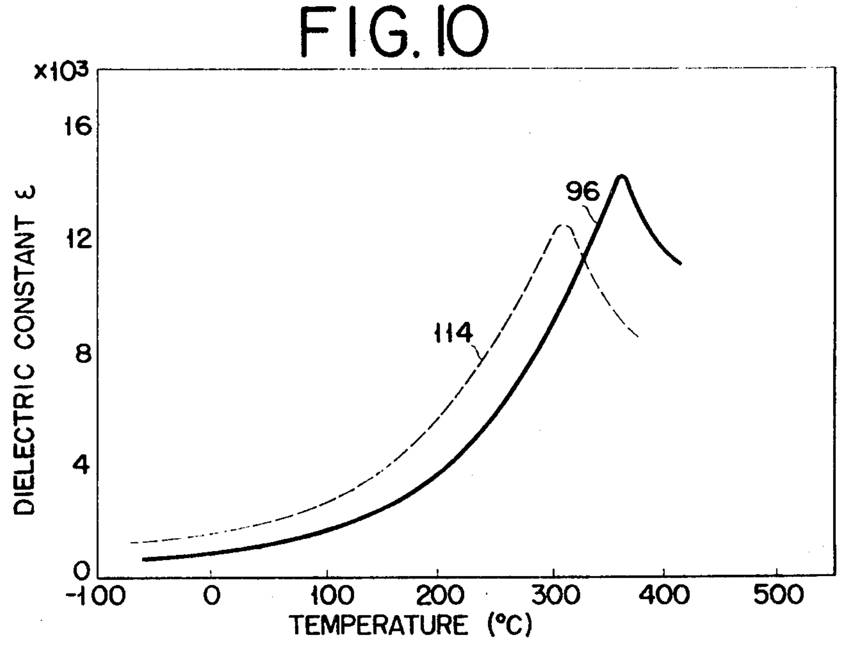
FIGS. 10 and 11 show the piezoelectric properties of two samples of the invention containing auxiliary $Cr_2O_3$.
Figure 11:
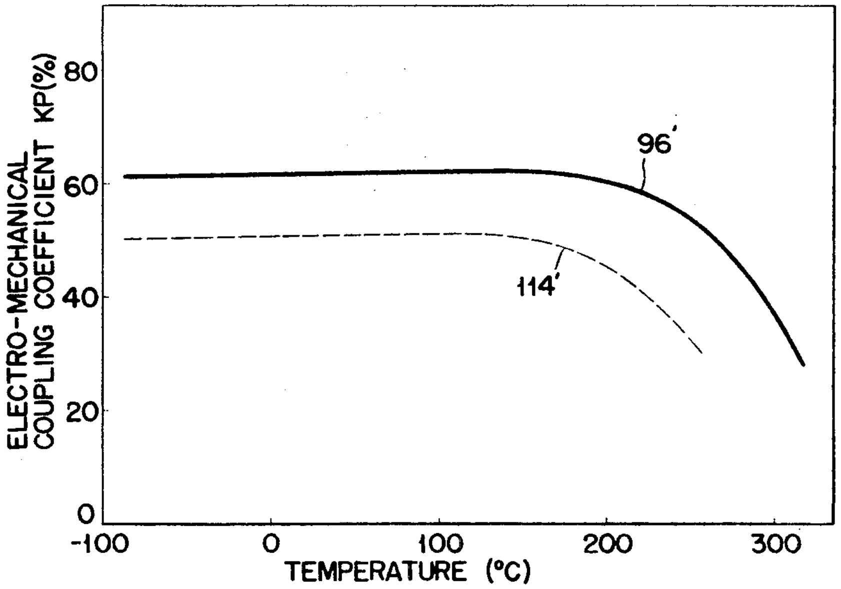

Clearly to define the relationship of the basic constituent and piezoelectric properties in connection with Example II, there were prepared samples by varying the proportions of $PbTiO_3$ and $PbZrO_3$ with that of auxiliary $Cr_2O_3$ fixed at 0.8% by weight and that of $Pb(Cd_{1/3} \cdot Nb_{2/3})O_3$ at 8.0 mol percent. The piezoelectric properties of these samples were examined, the relationship of the proportions of $PbTiO_3$ and $PbZrO_3$ and piezoelectric properties being presented in FIG. 8. In FIG. 8, curve *c* denotes the electro-mechanical coupling coefficient K*p* and curve *d* the mechanical quality factor $Q_M$. Further to determine the relationship of the proportions of the three basic components and piezo-electric properties, there were prepared samples by varying said proportions with addition of auxiliary $Cr_2O_3$ fixed at 0.6% by weight, the results being presented in FIG. 9. In this figure, curve *c'* represents the electro-mechanical coupling coefficient K*p* and curve *d'* the mechanical quality factor $Q_M$. Further determination was made of variations in the dielectric constant according to temperature change in connection with Examples 96 and 114 among those listed in Table 2 above, showing that they had a tendency of variation illustrated in FIG. 10 and high Curie points of 360° and 310° C. respectively. In FIG. 10, curves 96 and 114 represent Examples 96 and 114 respectively. Determination was also made of variations in the electro-mechanical coupling coefficient K*p* according to temperature change in connection with said examples, proving that they had a tendency of variation illustrated in FIG. 11 and little varied in the electro-mechanical coupling coefficient K*p* over a temperature range of −60 to 200° C. due to their high Curie points, maintaining the excellent stability of properties. In FIG. 11, curves 96' and 114 represent Examples 96 and 114. Further determination was made of variation during a given period of time after polarization in the resonance frequency *fr* and the electro-mechanical coupling coefficient K*p* in the diametrical direction in connection with Examples 90 and 109 given in Table 2 above and Examples 15 and 35 in Table 1, showing that these examples had a tendency of variation illustrated in FIGS. 12 and 13. In FIG. 12 indicating their tendency of variation in the resonance frequency, curves 90 and 109 represent Examples 90 and 109 respectively, and curves 15 and 35 Examples 15 and 35 respectively. FIG. 13 represents variations in the electro-mechanical coupling coefficient K*p*, in which curves 90' and 109' denote Examples 90 and 109 respectively, and curves 15' and 35' Examples 15 and 35 respectively. Addition of $Cr_2O_3$ has the effect of improving the piezoelectric properties with respect to change with time after polarization as is the case with $MnO_2$.

EXAMPLE III

Addition of NiO and/or CoO as an auxiliary component to the basic constituent (including for comparison samples only consisting of the basic constituent and two comparative samples outside the scope of the present invention)

NiO and/or CoO were used with the basic constituent in amounts of 0.1–3 percent by weight.

There were prepared 105 samples of Example III and also 2 samples in the same manner as in Example I. The composition and properties of each sample are presented in Table 3 below.

TABLE 3

| Sample No. | Basic constituent (mol percent) | | | Auxiliary component (percent by weight) | FT | d | ε | Kp | $Q_M$ |
|---|---|---|---|---|---|---|---|---|---|
| | $PbTiO_3$ | $PbZrO_3$ | $Pb(Cd_{1/3}Nb_{2/3})O_3$ | | | | | | |
| Example: | | | | | | | | | |
| 141 | 55.5 | 43.5 | 1.0 | NiO, 1.5 | 1,260 | 7.50 | 932 | 46.1 | 383 |
| 142 | 55.0 | 44.0 | 1.0 | NiO, 0.1 | 1,280 | 7.52 | 940 | 45.2 | 285 |
| 143 | 55.0 | 44.0 | 1.0 | NiO, 0.5 | 1,270 | 7.55 | 974 | 46.3 | 377 |
| 144 | 55.0 | 44.0 | 1.0 | NiO, 1.5 | 1,260 | 7.51 | 956 | 48.0 | 404 |
| 145 | 55.0 | 44.0 | 1.0 | NiO, 2.5 | 1,250 | 7.47 | 932 | 46.7 | 263 |
| 146 | 55.0 | 44.0 | 1.0 | CoO, 0.1 | 1,280 | 7.50 | 948 | 45.1 | 296 |
| 147 | 55.0 | 44.0 | 1.0 | CoO, 0.5 | 1,270 | 7.52 | 953 | 46.6 | 335 |
| 148 | 55.0 | 44.0 | 1.0 | CoO, 1.5 | 1,260 | 7.54 | 968 | 47.0 | 391 |
| 149 | 55.0 | 44.0 | 1.0 | CoO, 2.5 | 1,250 | 7.45 | 927 | 45.9 | 250 |
| 150 | 55.0 | 35.0 | 10.0 | 0 | 1,280 | 7.46 | 1,156 | 44.5 | 172 |
| 151 | 55.0 | 35.0 | 10.0 | NiO, 0.5 | 1,270 | 7.53 | 1,192 | 47.3 | 278 |
| 152 | 55.0 | 35.0 | 10.0 | NiO, 2.0 | 1,260 | 7.50 | 1,165 | 46.2 | 226 |
| 153 | 55.0 | 35.0 | 10.0 | CoO, 0.5 | 1,270 | 7.52 | 1,174 | 46.9 | 295 |
| 154 | 55.0 | 35.0 | 10.0 | CoO, 2.0 | 1,260 | 7.48 | 1,137 | 45.8 | 254 |
| 155 | 55.0 | 25.0 | 20.0 | 0 | 1,270 | 7.45 | 1,230 | 46.6 | 147 |
| 156 | 55.0 | 25.0 | 20.0 | NiO, 0.5 | 1,260 | 7.56 | 1,263 | 48.8 | 311 |
| 157 | 55.0 | 25.0 | 20.0 | NiO, 2.0 | 1,250 | 7.52 | 1,245 | 47.2 | 297 |
| 158 | 55.0 | 25.0 | 20.0 | CoO, 0.5 | 1,260 | 7.58 | 1,292 | 48.5 | 336 |
| 159 | 55.0 | 25.0 | 20.0 | CoO, 2.0 | 1,250 | 7.50 | 1,225 | 47.0 | 268 |
| 160 | 55.0 | 20.0 | 25.0 | 0 | 1,260 | 7.51 | 1,346 | 47.0 | 135 |
| 161 | 55.0 | 20.0 | 25.0 | NiO, 0.5 | 1,250 | 7.60 | 1,381 | 50.2 | 406 |
| 162 | 55.0 | 20.0 | 25.0 | NiO, 2.0 | 1,240 | 7.58 | 1,374 | 49.7 | 347 |
| 163 | 55.0 | 20.0 | 25.0 | CoO, 0.5 | 1,250 | 7.62 | 1,406 | 51.1 | 473 |
| 164 | 55.0 | 20.0 | 25.0 | CoO, 2.0 | 1,240 | 7.59 | 1,391 | 49.3 | 411 |
| 165 | 48.0 | 50.0 | 2.0 | NiO, 0.5 | 1,250 | 7.52 | 793 | 50.2 | 388 |
| 166 | 48.0 | 50.0 | 2.0 | NiO, 1.0 | 1,240 | 7.56 | 824 | 55.3 | 595 |
| 167 | 48.0 | 50.0 | 2.0 | NiO, 2.0 | 1,230 | 7.50 | 772 | 51.8 | 421 |
| 168 | 48.0 | 50.0 | 2.0 | CoO, 0.5 | 1,250 | 7.54 | 786 | 51.0 | 403 |
| 167 | 48.0 | 50.0 | 2.0 | NiO, 2.0 | 1,230 | 7.50 | 772 | 51.8 | 421 |
| 168 | 48.0 | 50.0 | 2.0 | CoO, 0.5 | 1,250 | 7.54 | 786 | 51.0 | 403 |
| 169 | 48.0 | 50.0 | 2.0 | CoO, 1.0 | 1,240 | 7.60 | 849 | 56.5 | 612 |
| 170 | 48.0 | 50.0 | 2.0 | CoO, 2.0 | 1,230 | 7.52 | 800 | 52.2 | 536 |
| 171 | 48.0 | 40.0 | 12.0 | NiO, 0.5 | 1,220 | 7.66 | 1,396 | 60.3 | 484 |
| 172 | 48.0 | 40.0 | 12.0 | NiO, 1.0 | 1,210 | 7.70 | 1,293 | 67.8 | 1,511 |
| 173 | 48.0 | 40.0 | 12.0 | NiO, 1.5 | 1,200 | 7.72 | 1,261 | 65.4 | 2,025 |
| 174 | 48.0 | 40.0 | 12.0 | NiO, 2.0 | 1,200 | 7.65 | 1,235 | 60.3 | 1,346 |
| 175 | 48.0 | 40.0 | 12.0 | NiO, 2.5 | 1,190 | 7.62 | 1,304 | 54.6 | 427 |
| 176 | 48.0 | 40.0 | 12.0 | CoO, 0.5 | 1,220 | 7.67 | 1,368 | 61.9 | 778 |
| 177 | 48.0 | 40.0 | 12.0 | CoO, 1.0 | 1,210 | 7.73 | 1,326 | 68.6 | 1,411 |
| 178 | 48.0 | 40.0 | 12.0 | CoO, 1.5 | 1,200 | 7.74 | 1,292 | 66.4 | 1,948 |
| 179 | 48.0 | 40.0 | 12.0 | CoO, 2.0 | 1,190 | 7.68 | 1,274 | 62.2 | 1,267 |
| 180 | 48.0 | 40.0 | 12.0 | CoO, 2.5 | 1,190 | 7.60 | 1,257 | 56.2 | 382 |
| 181 | 48.0 | 30.0 | 22.0 | NiO, 0.5 | 1,200 | 7.56 | 1,664 | 58.6 | 646 |
| 182 | 48.0 | 30.0 | 22.0 | NiO, 1.0 | 1,190 | 7.60 | 1,693 | 62.7 | 954 |
| 183 | 48.0 | 30.0 | 22.0 | NiO, 2.0 | 1,180 | 7.58 | 1,610 | 57.3 | 449 |
| 184 | 48.0 | 30.0 | 22.0 | CoO, 0.5 | 1,200 | 7.62 | 1,682 | 59.5 | 520 |
| 185 | 48.0 | 30.0 | 22.0 | CoO, 1.0 | 1,190 | 7.66 | 1,703 | 64.4 | 798 |
| 186 | 48.0 | 30.0 | 22.0 | CoO, 2.0 | 1,180 | 7.63 | 1,669 | 59.2 | 603 |
| 187 | 48.0 | 20.0 | 32.0 | NiO, 0.5 | 1,180 | 7.57 | 1,874 | 56.2 | 516 |
| 188 | 48.0 | 20.0 | 32.0 | NiO, 1.0 | 1,170 | 7.67 | 1,902 | 60.8 | 741 |
| 189 | 48.0 | 20.0 | 32.0 | NiO, 2.0 | 1,160 | 7.53 | 1,848 | 54.6 | 388 |
| 190 | 48.0 | 20.0 | 32.0 | CoO, 0.5 | 1,180 | 7.59 | 1,886 | 57.4 | 618 |
| 191 | 48.0 | 20.0 | 32.0 | CoO, 1.0 | 1,170 | 7.68 | 1,937 | 61.7 | 935 |
| 192 | 48.0 | 20.0 | 32.0 | CoO, 2.0 | 1,160 | 7.60 | 1,875 | 55.3 | 662 |

TABLE 3—Continued

| | Basic constituent (mol percent) | | | Auxiliary component | | | | | |
|---|---|---|---|---|---|---|---|---|---|
| Sample No. | $PbTiO_3$ | $PbZrO_3$ | $Pb(Cd_{1/3}Nb_{2/3})O_3$ | (percent by weight) | FT | *d* | $\epsilon$ | K*p* | $Q_M$ |
| Example: | | | | | | | | | |
| 193 | 43.0 | 52.0 | 5.0 | NiO, 0.5 | 1,200 | 7.56 | 1,294 | 52.0 | 486 |
| 194 | 43.0 | 52.0 | 5.0 | NiO, 1.0 | 1,190 | 7.64 | 1,300 | 61.1 | 729 |
| 195 | 43.0 | 52.0 | 5.0 | NiO, 2.0 | 1,180 | 7.61 | 1,273 | 53.8 | 583 |
| 196 | 43.0 | 52.0 | 5.0 | CoO, 0.5 | 1,200 | 7.57 | 1,312 | 54.7 | 496 |
| 197 | 43.0 | 52.0 | 5.0 | CoO, 1.0 | 1,200 | 7.68 | 1,351 | 63.6 | 894 |
| 198 | 43.0 | 52.0 | 5.0 | CoO, 2.0 | 1,180 | 7.54 | 1,323 | 54.4 | 628 |
| 199 | 43.0 | 42.0 | 15.0 | NiO, 0.5 | 1,180 | 7.60 | 1,606 | 51.8 | 431 |
| 200 | 43.0 | 42.0 | 15.0 | NiO, 1.0 | 1,170 | 7.62 | 1,658 | 59.1 | 923 |
| 201 | 43.0 | 42.0 | 15.0 | NiO, 2.0 | 1,160 | 7.59 | 1,634 | 53.4 | 684 |
| 202 | 43.0 | 42.0 | 15.0 | CoO, 0.5 | 1,180 | 7.61 | 1,613 | 52.2 | 458 |
| 203 | 43.0 | 42.0 | 15.0 | CoO, 1.0 | 1,170 | 7.64 | 1,667 | 60.2 | 895 |
| 204 | 43.0 | 42.0 | 15.0 | CoO, 2.0 | 1,160 | 7.57 | 1,624 | 53.8 | 577 |
| 205 | 43.0 | 32.0 | 25.0 | NiO, 0.5 | 1,160 | 7.55 | 1,970 | 50.6 | 436 |
| 206 | 43.0 | 32.0 | 25.0 | NiO, 1.0 | 1,150 | 7.58 | 2,021 | 56.7 | 803 |
| 207 | 43.0 | 32.0 | 25.0 | NiO, 2.0 | 1,140 | 7.54 | 1,902 | 53.3 | 522 |
| 208 | 43.0 | 32.0 | 25.0 | CoO, 0.5 | 1,160 | 7.56 | 1,988 | 51.7 | 515 |
| 209 | 43.0 | 32.0 | 25.0 | CoO, 1.0 | 1,150 | 7.60 | 2,113 | 57.4 | 946 |
| 210 | 43.0 | 32.0 | 25.0 | CoO, 2.0 | 1,140 | 7.53 | 1,965 | 52.9 | 499 |
| 211 | 43.0 | 22.0 | 35.0 | NiO, 0.5 | 1,160 | 7.47 | 1,506 | 48.3 | 327 |
| 212 | 43.0 | 22.0 | 35.0 | NiO, 1.0 | 1,150 | 7.50 | 1,467 | 52.4 | 811 |
| 213 | 43.0 | 22.0 | 35.0 | CoO, 0.5 | 1,160 | 7.49 | 1,511 | 49.0 | 415 |
| 214 | 43.0 | 22.0 | 35.0 | CoO, 1.0 | 1,150 | 7.53 | 1,490 | 53.5 | 926 |
| 215 | 43.0 | 22.0 | 35.0 | NiO, 1.0; ClO, 1.0 | 1,140 | 7.51 | 1,448 | 48.7 | 467 |
| Comp.: | | | | | | | | | |
| 216 | 43.0 | 12.0 | 45.0 | NiO, 0.5 | 1,130 | 7.44 | 1,185 | 48.2 | 445 |
| 217 | 43.0 | 12.0 | 45.0 | NiO, 1.0 | 1,120 | 7.47 | 1,162 | 50.1 | 784 |
| 218 | 43.0 | 12.0 | 45.0 | CoO, 0.5 | 1,130 | 7.45 | 1,176 | 49.4 | 526 |
| 219 | 43.0 | 12.0 | 45.0 | CoO, 1.0 | 1,120 | 7.50 | 1,134 | 51.8 | 863 |
| 220 | 43.0 | 12.0 | 45.0 | NiO, 1.0 CoO, 1.0 | 1,120 | 7.46 | 1,128 | 48.3 | 317 |
| Example: | | | | | | | | | |
| 221 | 39.5 | 53.5 | 7.0 | CoO, 1.0 | 1,220 | 7.49 | 1,238 | 45.9 | 383 |
| 222 | 38.0 | 53.0 | 9.0 | NiO, 0.5 | 1,220 | 7.51 | 1,184 | 47.1 | 359 |
| 223 | 38.0 | 53.0 | 9.0 | NiO, 1.0 | 1,210 | 7.53 | 1,130 | 50.6 | 588 |
| 224 | 38.0 | 53.0 | 9.0 | CoO, 0.5 | 1,220 | 7.54 | 1,192 | 48.7 | 463 |
| 225 | 38.0 | 53.0 | 9.0 | CoO, 1.0 | 1,210 | 7.56 | 1,146 | 53.3 | 614 |
| 226 | 38.0 | 53.0 | 9.0 | NiO, 1.0 | 1,200 | 7.49 | 1,105 | 46.8 | 307 |
| 227 | 38.0 | 43.0 | 19.0 | NiO, 0.5 | 1,200 | 7.50 | 1,396 | 50.5 | 459 |
| 228 | 38.0 | 43.0 | 19.0 | NiO, 1.0 | 1,190 | 7.54 | 1,410 | 52.6 | 636 |
| 229 | 38.0 | 43.0 | 19.0 | NiO, 2.0 | 1,180 | 7.51 | 1,381 | 50.1 | 466 |
| 230 | 38.0 | 43.0 | 19.0 | CoO, 0.5 | 1,200 | 7.54 | 1,377 | 49.8 | 395 |
| 231 | 38.0 | 43.0 | 19.0 | CoO, 1.0 | 1,190 | 7.56 | 1,343 | 41.9 | 472 |
| 232 | 38.0 | 43.0 | 19.0 | CoO, 2.0 | 1,180 | 7.50 | 1,306 | 47.6 | 311 |
| 233 | 38.0 | 33.0 | 29.0 | NiO, 0.5 | 1,170 | 7.60 | 1,088 | 52.7 | 607 |
| 234 | 38.0 | 33.0 | 29.0 | ClO, 0.5 | 1,170 | 7.59 | 1,065 | 51.0 | 519 |
| 235 | 38.0 | 33.0 | 29.0 | CoO, 0.5; NiO, 0.5 | 1,160 | 7.57 | 1,051 | 53.5 | 744 |
| 236 | 38.0 | 33.0 | 29.0 | NiO, 1.0; CoO, 0.5 | 1,150 | 7.54 | 1,036 | 50.9 | 585 |
| 237 | 38.0 | 23.0 | 39.0 | NiO. 0.5 | 1,140 | 7.43 | 987 | 47.3 | 355 |
| 238 | 38.0 | 23.0 | 39.0 | NiO, 2.5 | 1,130 | 7.50 | 930 | 46.0 | 276 |
| 239 | 38.0 | 23.0 | 39.0 | CoO, 2.5 | 1,130 | 7.47 | 944 | 46.3 | 308 |
| 240 | 38.0 | 18.0 | 44.0 | NiO, 0.1 | 1,120 | 7.41 | 795 | 45.3 | 364 |
| 241 | 33.0 | 18.0 | 44.0 | NiO, 1.0 | 1,120 | 7.46 | 813 | 47.7 | 456 |
| 242 | 38.0 | 18.0 | 44.0 | NiO, 2.5 | 1,110 | 7.42 | 764 | 45.6 | 317 |
| 243 | 38.0 | 18.0 | 44.0 | CoO, 0.1 | 1,120 | 7.42 | 801 | 45.5 | 412 |
| 244 | 38.0 | 18.0 | 44.0 | CoO, 0.5 | 1,120 | 7.45 | 826 | 46.7 | 585 |
| 245 | 38.0 | 18.0 | 44.0 | CoO, 1.0 | 1,110 | 7.50 | 863 | 47.9 | 744 |
| 246 | 38.0 | 18.0 | 44.0 | CoO, 2.5 | 1,100 | 7.47 | 825 | 45.7 | 486 |
| Comp.: | | | | | | | | | |
| 231a | 38.0 | 18.0 | 44.0 | CoO, 3.0 | 1,110 | 7.39 | 800 | 42.8 | 280 |
| 231b | 38.0 | 18.0 | 44.0 | NiO, 3.0 | 1,110 | 7.40 | 792 | 42.9 | 197 |
| Example: | | | | | | | | | |
| 247 | 34.0 | 16.0 | 50.0 | NiO, 1.5 | 1,090 | 7.34 | 781 | 46.2 | 458 |
| 248 | 34.0 | 16.0 | 50.0 | CoO, 1.5 | 1,090 | 7.45 | 800 | 47.8 | 611 |
| 249 | 34.0 | 16.0 | 50.0 | NiO, 2.5 | 1,090 | 7.42 | 796 | 44.0 | 382 |
| 250 | 34.0 | 16.0 | 50.0 | CoO, 2.5 | 1,090 | 7.41 | 775 | 43.2 | 356 |

Clearly to define the relationship of the basic constituent piezoelectric properties, there were prepared samples of this example by varying the proportions of $PbTiO_3$ and $PbZrO_3$ with that of NiO fixed at 0.8% by weight and that of $Pb(Cd_{1/3}\cdot Nb_{2/3})O_3$ at 9.0 mol percent. The piezoelectric properties of these samples were examined, the relationship of the proportions of $PbTiO_3$ and $PbZrO_3$ and the piezoelectric properties being presented in FIG. 14. In this figure, curve *e* represents the electro-mechanical coupling coefficient K*p* and curve *f* the mechanical quality factor $Q_M$. Further there were prepared samples by varying the proportions of the three basic components of $Pb(Cd_{1/3}\cdot Nb_{2/3})O_3$, $PbTiO_3$ and $PbZrO_3$ with addition of CoO fixed at 0.9% by weight to determine the relationship of said basic components and the piezoelectric properties, the results being presented in FIG. 15. In this figure, curve *e'* denotes the electro-mechanical coupling coefficient K*p* and curve *f'* the mechanical quality factor $Q_M$. Determination was made of variations in the dielectric constant according to temperature change in connection with Examples 172 and 178 given in Table 3 above, showing that they had a tendency of variation illustrated in FIG. 16 and a high Curie point of 360° C. In this figure, curves 172 and 198 represent Examples 172 and 198. Determination was made of variations in the electro-mechanical coupling coefficient K*p* according to temperature change in both examples, showing that they had a tendency of variation illustrated in FIG. 17 and varied little in the electro-mechanical coupling coefficient K*p* over a temperature range of −60 to 200° C., maintaining stable excellent properties. In FIG. 17, curves 172' and 198' denote Examples 172 and 198 respectively.

Further determination was made of variations in the resonance frequency *fr* during a given period of time after polarization and the electro-mechanical coupling coefficient K*p* in the diametrical direction in connection with Examples 154 and 190 in Table 3 above and Examples 28 and 42 in Table 1, showing that they had a tendency of variation illustrated in FIGS. 18 and 19. In FIG. 18 showing their tendency of variation in the resonance frequency, curves 154 and 190 represent Examples 154 and 190 and curves 28 and 42 Examples 28 and 42. FIG. 19 represents the tendency of these examples to vary in the electro-mechanical coupling coefficient. In this figure, curves 154' and 190' denote Examples 154 and 190 and curves 28' and 42' Examples 28 and 42. Where a sample of Example 178 was used in a filter, it varied in the center frequency within a range of ±0.2% over a temperature range of −40 to 60° C., displaying a stable performance. Addition of NiO and/or CoO was proved to assist in improving the properties of the present oxide piezoelectric material.

EXAMPLE IV

Addition of $La_2O_3$ and/or $Bi_2O_3$ as an auxiliary component to the basic constituent (including for comparison two samples outside of the scope of the present invention)

There were prepared 106 samples of Example IV and two comparative samples in the same manner as in Example I. The compositions and properties of these samples are presented in Table 4 below.

TABLE 4

| Sample No. | Basic constituent (mol percent) | | | Auxiliary component (percent by weight) | FT | d | ε | Kp | $Q_m$ |
|---|---|---|---|---|---|---|---|---|---|
| | $PaTiO_3$ | $PbZrO_3$ | $Pb(Cd_{1/3}Nb_{2/3})O_3$ | | | | | | |
| Example: | | | | | | | | | |
| 251 | 55.5 | 43.5 | 1.0 | $Bi_2O_3$, 1.5 | 1,270 | 7.52 | 851 | 45.6 | 364 |
| 252 | 55.5 | 43.5 | 1.0 | $La_2O_3$, 1.5 | 1,270 | 7.55 | 882 | 46.3 | 406 |
| 253 | 55.5 | 44.0 | 1.0 | $La_2O_3$, 0.1 | 1,280 | 7.53 | 940 | 45.4 | 285 |
| 254 | 55.0 | 44.0 | 1.0 | $La_2O_3$, 1.0 | 1,270 | 7.55 | 976 | 47.6 | 373 |
| 255 | 55.0 | 44.0 | 1.0 | $La_2O_2$, 2.0 | 1,260 | 7.51 | 956 | 48.7 | 404 |
| 256 | 55.0 | 44.0 | 1.0 | $La_2O_3$, 3.0 | 1,250 | 7.50 | 932 | 46.6 | 268 |
| 257 | 55.0 | 44.0 | 1.0 | $Bi_2O_3$, 0.1 | 1,280 | 7.52 | 948 | 45.1 | 297 |
| 258 | 55.0 | 44.0 | 1.0 | $Bi_2O_3$, 1.0 | 1,270 | 7.56 | 953 | 46.9 | 335 |
| 259 | 55.0 | 44.0 | 1.0 | $Bi_2O_3$, 2.0 | 1,260 | 7.60 | 971 | 49.2 | 451 |
| 260 | 55.0 | 44.0 | 1.0 | $Bi_2O_3$, 3.0 | 1,250 | 7.49 | 939 | 45.9 | 314 |
| 261 | 55.0 | 35.0 | 10.0 | $La_2O_3$, 1.0 | 1,270 | 7.54 | 1,195 | 47.6 | 300 |
| 262 | 55.0 | 35.0 | 10.0 | $La_2O_3$, 2.0 | 1,260 | 7.58 | 1,162 | 50.0 | 263 |
| 263 | 55.0 | 35.0 | 10.0 | $Bi_2O_3$, 1.0 | 1,270 | 7.56 | 1,174 | 48.7 | 296 |
| 264 | 55.0 | 35.0 | 10.0 | $Li_2O_3$, 2.0 | 1,250 | 7.53 | 1,180 | 49.4 | 412 |
| 265 | 55.0 | 25.0 | 20.0 | $La_2O_3$, 1.0 | 1,260 | 7.60 | 1,263 | 49.1 | 388 |
| 266 | 55.0 | 25.0 | 20.0 | $La_2O_3$, 2.0 | 1,250 | 7.62 | 1,245 | 49.6 | 541 |
| 267 | 55.0 | 25.0 | 20.0 | $Bi_2O_3$, 1.0 | 1,260 | 7.58 | 1,292 | 48.7 | 420 |
| 268 | 55.0 | 25.0 | 20.0 | $Bi_2O_3$, 2.0 | 1,250 | 7.61 | 1,221 | 50.3 | 315 |
| 269 | 55.0 | 20.0 | 25.0 | $La_2O_3$, 1.0 | 1,250 | 7.62 | 1,384 | 50.3 | 406 |
| 270 | 55.0 | 20.0 | 25.0 | $La_2O_3$, 2.0 | 1,250 | 7.65 | 1,340 | 52.6 | 548 |
| 271 | 55.0 | 20.0 | 25.0 | $La_2O_3$, 3.0 | 1,250 | 7.59 | 1,311 | 49.2 | 384 |
| 272 | 55.0 | 20.0 | 25.0 | $Bi_2O_3$, 1.0 | 1,250 | 7.60 | 1,407 | 51.8 | 472 |
| 273 | 55.0 | 20.0 | 25.0 | $Bo_2O_3$, 2.0 | 1,250 | 7.66 | 1,392 | 50.6 | 611 |
| 274 | 55.0 | 20.0 | 25.0 | $Bi_2O_3$, 3.0 | 1,250 | 7.58 | 1,363 | 48.9 | 589 |
| 275 | 55.0 | 17.0 | 28.0 | $La_2O_3$, 1.0 | 1,220 | 7.62 | 1,211 | 47.5 | 392 |
| 276 | 48.0 | 50.0 | 2.0 | $La_2O_3$. 1.0 | 1,260 | 7.87 | 793 | 53.8 | 491 |
| 277 | 48.0 | 50.0 | 2.0 | $La_2O_3$, 2.0 | 1,240 | 7.62 | 824 | 54.2 | 714 |
| 278 | 48.0 | 50.0 | 2.0 | $Bi_2O_3$, 1.0 | 1,240 | 7.58 | 786 | 52.3 | 403 |
| 279 | 48.0 | 50.0 | 2.0 | $Bi_2O_3$, 2.0 | 1,240 | 7.64 | 849 | 57.1 | 615 |
| 280 | 48.0 | 40.0 | 12.0 | $La_2O_3$, 0.5 | 1,240 | 7.66 | 1,395 | 60.8 | 843 |
| 281 | 48.0 | 40.0 | 12.0 | $La_2O_3$, 1.5 | 1,220 | 7.72 | 1,292 | 66.5 | 1,246 |
| 282 | 48.0 | 40.0 | 12.0 | $La_2O_3$, 2.5 | 1,210 | 7.68 | 1,260 | 65.4 | 2,131 |
| 283 | 48.0 | 40.0 | 12.0 | $Bi_2O_3$, 0.5 | 1,210 | 7.67 | 1,366 | 61.9 | 758 |
| 284 | 48.0 | 40.0 | 12.0 | $Bi_2O_3$, 1.5 | 1,210 | 7.75 | 1,311 | 68.4 | 1,402 |
| 285 | 48.0 | 40.0 | 12.0 | $Bi_2O_3$, 2.5 | 1,210 | 7.70 | 1,293 | 66.5 | 2,025 |
| 286 | 48.0 | 40.0 | 12.0 | $La_2O_3$, 0.5<br>$Bi_2O_3$, 0.5 | 1,210 | 7.71 | 1,295 | 62.2 | 926 |
| 287 | 48.0 | 40.0 | 12.0 | $Bi_2O_3$, 1.0<br>$Bi_2O_3$, 1.0 | 1,210 | 7.74 | 1,273 | 65.0 | 1,267 |
| 288 | 48.0 | 40.0 | 12.0 | $Bi_2O_3$, 1.5<br>$Bi_2O_3$, 1.5 | 1,210 | 7.70 | 1,256 | 59.1 | 724 |
| 289 | 48.0 | 30.0 | 22.0 | $La_2O_3$, 1.0 | 1,190 | 7.60 | 1,694 | 60.2 | 846 |
| 290 | 48.0 | 30.0 | 22.0 | $La_2O_3$, 2.0 | 1,190 | 7.65 | 1,610 | 61.4 | 954 |
| 291 | 48.0 | 30.0 | 22.0 | $Bi_2O_3$, 1.0 | 1,190 | 7.61 | 1,596 | 62.8 | 562 |
| 292 | 48.0 | 30.0 | 22.0 | $Bi_2O_3$ 2.0 | 1,190 | 7.64 | 1,545 | 64.4 | 685 |
| 293 | 48.0 | 20.0 | 32.0 | $La_2O_3$, 1.0 | 1,170 | 7.57 | 1,863 | 56.1 | 515 |
| 294 | 48.0 | 20.0 | 32.0 | $La_2O_3$, 2.0 | 1,170 | 7.62 | 1,902 | 60.0 | 741 |
| 295 | 48.0 | 20.0 | 32.0 | $La_2O_3$, 2.5 | 1,170 | 7.60 | 1,816 | 58.2 | 496 |
| 296 | 48.0 | 20.0 | 32.0 | $Bi_2O_3$, 1.0 | 1,170 | 7.59 | 1,885 | 57.3 | 598 |
| 297 | 48.0 | 20.0 | 32.0 | $Bi_2O_3$, 2.0 | 1,170 | 7.66 | 1,911 | 60.8 | 883 |
| 298 | 48.0 | 20.0 | 32.0 | $Bi_2O_3$, 2.5 | 1,170 | 7.61 | 1,844 | 57.9 | 645 |
| 299 | 45.0 | 53.5 | 15.0 | $La_2O_3$, 1.0 | 1,230 | 7.58 | 943 | 48.5 | 605 |
| 300 | 45.0 | 17.0 | 38.0 | $Bi_2O_3$, 1.5 | 1,120 | 7.54 | 1,178 | 27.2 | 479 |
| 301 | 43.0 | 52.0 | 5.0 | $La_2O_3$, 1.0 | 1,200 | 7.56 | 1,293 | 42.8 | 487 |
| 302 | 43.0 | 52.0 | 5.0 | $La_2O_3$, 2.0 | 1,200 | 9.63 | 1,300 | 58.9 | 709 |
| 303 | 43.0 | 52.0 | 5.0 | $Bi_2O_3$, 1.0 | 1,200 | 7.58 | 1,315 | 54.6 | 496 |
| 304 | 43.0 | 52.0 | 5.0 | $Bi_2O_3$, 2.0 | 1,200 | 7.66 | 1,356 | 60.1 | 890 |
| 305 | 43.0 | 42.0 | 15.0 | $La_2O_3$, 1.0 | 1,180 | 7.60 | 1,604 | 51.0 | 433 |
| 306 | 43.0 | 42.0 | 15.0 | $La_2O_3$, 2.0 | 1,180 | 7.65 | 1,651 | 59.2 | 845 |
| 307 | 43.0 | 42.0 | 15.0 | $Bi_2O_3$, 1.0 | 1,180 | 7.63 | 1,632 | 53.5 | 672 |
| 308 | 43.0 | 42.0 | 15.0 | $Bi_2O_3$, 2.0 | 1,180 | 7.68 | 1,667 | 60.4 | 891 |
| 309 | 43.0 | 32.0 | 25.0 | $La_2O_3$, 1.0 | 1,160 | 7.55 | 1,977 | 50.3 | 456 |
| 310 | 43.0 | 32.0 | 25.0 | $La_2O_3$, 2.0 | 1,160 | 7.59 | 2,020 | 56.6 | 814 |
| 311 | 43.0 | 32.0 | 25.0 | $Bi_2O_3$, 1.0 | 1,160 | 7.54 | 1,981 | 51.7 | 515 |
| 312 | 43.0 | 32.0 | 25.0 | $Bi_2O_3$, 2.0 | 1,160 | 7.60 | 2,114 | 58.5 | 943 |
| 313 | 43.0 | 22.0 | 35.0 | $La_2O_3$, 1.0 | 1,160 | 7.51 | 1,506 | 48.6 | 335 |
| 314 | 43.0 | 22.0 | 35.0 | $La_2O_3$, 2.0 | 1,160 | 7.55 | 1,463 | 52.3 | 821 |
| 315 | 43.0 | 22.0 | 35.0 | $Bi_2O_3$, 1.0 | 1,160 | 7.50 | 1,500 | 49.0 | 414 |
| 316 | 43.0 | 22.0 | 35.0 | $Bi_2O_3$, 2.0 | 1,160 | 7.58 | 1,421 | 53.5 | 926 |
| 317 | 43.0 | 22.0 | 35.0 | $La_2O_3$, 1.0<br>$Bi_2O_3$, 1.0 | 1,160 | 7.56 | 1,497 | 51.8 | 994 |
| 318 | 38.0 | 53.0 | 9.0 | $La_2O_3$, 1.0 | 1,210 | 7.51 | 1,180 | 47.2 | 459 |
| 319 | 38.0 | 53.0 | 9.0 | $La_2O_3$, 2.0 | 1,210 | 7.56 | 1,192 | 51.6 | 518 |
| 320 | 38.0 | 53.0 | 9.0 | $La_2O_3$, 3.0 | 1,210 | 7.53 | 1,146 | 46.5 | 462 |
| 321 | 39.5 | 53.5 | 7.0 | $Bi_2O_3$, 1.5 | 1,220 | 7.53 | 1,296 | 47.3 | 451 |
| 322 | 39.5 | 53.5 | 7.0 | $La_2O_3$, 1.5 | 1,220 | 7.55 | 1,311 | 47.8 | 398 |
| 323 | 38.0 | 53.0 | 9.0 | $Bi_2O_3$, 1.0 | 1,210 | 7.56 | 1,200 | 48.1 | 543 |
| 324 | 38.0 | 53.0 | 9.0 | $Bi_2O_3$, 2.0 | 1,210 | 7.60 | 1,188 | 50.5 | 722 |
| 325 | 38.0 | 53.0 | 9.0 | $Bi_2O_3$, 3.0 | 1,210 | 7.54 | 1,151 | 47.4 | 406 |
| 326 | 38.0 | 43.0 | 19.0 | $La_2O_3$, 1.0 | 1,190 | 7.49 | 1,390 | 50.6 | 469 |
| 327 | 38.0 | 43.0 | 19.0 | $La_2O_3$, 2.0 | 1,190 | 7.52 | 1,410 | 52.5 | 631 |
| 328 | 38.0 | 43.0 | 19.0 | $Bi_2O_3$, 1.0 | 1,190 | 7.50 | 1,398 | 51.2 | 583 |
| 329 | 38.0 | 43.0 | 19.0 | $Bi_2O_3$, 2.0 | 1,190 | 7.53 | 1,426 | 53.4 | 748 |
| 330 | 38.0 | 33.0 | 29.0 | $La_2O_3$, 0.2 | 1,160 | 7.55 | 1,050 | 48.1 | 375 |
| 331 | 38.0 | 33.0 | 29.0 | $La_2O_3$, 1.5 | 1,160 | 7.61 | 1,075 | 50.2 | 590 |
| 332 | 38.0 | 33.0 | 29.0 | $La_2O_3$, 2.5 | 1,160 | 7.57 | 1,033 | 48.6 | 421 |
| 333 | 38.0 | 33.0 | 29.0 | $Bi_2O_3$, 0.5 | 1,160 | 7.59 | 1,094 | 49.4 | 464 |
| 334 | 38.0 | 33.0 | 29.0 | $Bi_2O_3$, 1.5 | 1,160 | 7.65 | 1,120 | 51.8 | 636 |
| 335 | 38.0 | 33.0 | 29.0 | $Bi_2O_3$, 2.5 | 1,160 | 7.60 | 1,102 | 48.3 | 497 |
| 336 | 38.0 | 23.0 | 39.0 | $La_2O_3$, 1.0 | 1,30 | 7.48 | 988 | 47.2 | 365 |

TABLE 4—Continued

| Sample No. | Basic constituent (mol percent) PbTiO$_3$ | PbZrO$_3$ | Pb(Cd$_{1/3}$Nb$_{2/3}$)O$_3$ | Auxiliary component (percent by weight) | FT | d | ε | Kp | Q$_m$ |
|---|---|---|---|---|---|---|---|---|---|
| Example: | | | | | | | | | |
| 337 | 38.0 | 23.0 | 39.0 | La$_2$O$_3$, 2.0 | 1,130 | 7.53 | 931 | 46.0 | 265 |
| 338 | 38.0 | 23.0 | 39.0 | Bi$_2$O$_3$, 1.0 | 1,130 | 7.50 | 944 | 48.3 | 414 |
| 339 | 38.0 | 23.0 | 39.0 | Bi$_2$O$_3$, 2.0 | 1,130 | 7.49 | 922 | 46.3 | 308 |
| 340 | 38.0 | 18.0 | 44.0 | La$_2$O$_3$, 1.0 | 1,120 | 7.46 | 703 | 46.9 | 366 |
| 341 | 28.0 | 18.0 | 44.0 | La$_2$O$_3$. 2.0 | 1,120 | 7.48 | 795 | 47.7 | 457 |
| 342 | 38.0 | 18.0 | 44.0 | Bi$_2$O$_3$, 1.0 | 1,120 | 7.50 | 813 | 47.9 | 484 |
| 343 | 38.0 | 18.0 | 44.0 | Bi$_2$O$_3$, 2.0 | 1,120 | 7.54 | 841 | 48.5 | 623 |
| 344 | 38.0 | 18.0 | 44.0 | La$_2$O$_3$, 0.7 Bi$_2$O$_3$, 0.7 | 1,120 | 7.52 | 816 | 47.6 | 549 |
| 345 | 38.0 | 18.0 | 44.0 | La$_2$O$_3$, 0.05; Bi$_2$O$_3$, 0.05 | 1,130 | 7.46 | 775 | 45.1 | 346 |
| 346 | 38.0 | 18.0 | 44.0 | Bi$_2$O$_3$, 2.5; Bi$_2$O$_3$, 0.5 | 1,120 | 7.50 | 758 | 45.9 | 368 |
| Comp.: | | | | | | | | | |
| 346a | 38.0 | 18.0 | 44.0 | La$_2$O$_3$, 4.0 | 1,120 | 7.39 | 763 | 42.8 | 218 |
| 346b | 38.0 | 18.0 | 44.0 | Bi$_2$O$_3$, 4.0 | 1,120 | 7.36 | 792 | 42.4 | 186 |
| Example: | | | | | | | | | |
| 347 | 35.0 | 17.0 | 48.0 | La$_2$O$_3$, 0.5 | 1,110 | 7.42 | 750 | 47.5 | 326 |
| 348 | 35.0 | 27.0 | 48.0 | Bi$_2$O$_3$, 1.0 | 1,140 | 7.52 | 973 | 48.6 | 487 |
| 349 | 35.0 | 36.0 | 29.0 | Bi$_2$O$_3$, 1.0 | 1,160 | 7.64 | 996 | 53.2 | 467 |
| 350 | 35.0 | 44.0 | 21.0 | Bi$_2$O$_3$, 2.0 | 1,150 | 7.61 | 1,235 | 51.9 | 624 |
| 351 | 35.0 | 53.0 | 12.0 | La$_2$O$_3$, 1.5 | 1,200 | 7.57 | 1,126 | 49.8 | 368 |
| 352 | 34.0 | 16.0 | 50.0 | La$_2$O$_3$, 1.5 | 1,100 | 7.48 | 761 | 45.5 | 470 |
| 353 | 34.0 | 16.0 | 50.0 | Bi$_2$O$_3$, 0.5 | 1,090 | 7.45 | 738 | 44.7 | 316 |
| 354 | 34.0 | 16.0 | 50.0 | Bi$_2$O$_3$, 1.0 | 1,090 | 7.47 | 754 | 45.0 | 443 |
| 355 | 34.0 | 16.0 | 50.0 | Bi$_2$O$_3$, 2.0 | 1,090 | 7.44 | 783 | 44.2 | 358 |
| 356 | 34.0 | 16.0 | 50.0 | La$_2$O$_3$, 2.0 | 1,090 | 7.45 | 791 | 43.9 | 409 |

Determination was made of variations in the electro-mechanical coupling coefficient $Kp$ and mechanical quality factor $Q_M$ of the samples of Example IV by varying the proportions of $Pb(Cd_{1/3}\cdot Nb_{2/3})O_3$, $PbTiO_3$ and $PbZrO_3$ forming the basic constituents with that of for example, auxiliary $Bi_2O_3$ fixed at 1.0 part by weight per 100 parts by weight of said basic constituent, showing that they had a tendency of variation illustrated in FIG. 20. In any case where the proportion of $Pb(Cd_{1/3}\cdot Nb_{2/3})O_3$ fell outside of the range of 1.0 to 50.0 mol percent, the resultant product did not have the desired piezoelectric properties. In FIG. 20, curve *g* denotes the electro-mechanical coupling coefficient $Kp$ and curve *h* the mechanical quality factor $Q_M$. Also where $PbTiO_3$ involved in said basic constituent increased over 55.5 mol percent decreased to below 34.0 mol percent there was not obtained a piezoelectric material which had a large electro-mechanical coupling coefficient $Kp$ and presented little change in the properties with respect to temperature variation and during a long period of time after polarization. Accordingly, the resultant sample could not be satisfactorily used in practical application, for example, an oscillation element for generating supersonic waves. Further determination was made of variations in the piezoelectric properties of the sample of Example IV by varying the proportions of $PbTiO_3$ and $PbZrO_3$ involved in the basic constituent with addition of auxiliary $La_2O_3$ fixed at 1.5 parts by weight per 100 parts by weight of the basic constituent and the proportion of $$Pb(Cd_{1/3}\cdot Nb_{2/3})O_3$$

included in said constituent at 9.0 mol percent, showing that said samples had a tendency of variation illustrated in FIG. 21. In this figure curve *g'* represents the electro-mechanical coupling coefficient $Kp$ and curve *h'* the mechanical quality factor $Q_M$. As apparent from FIGS. 20 and 21, where the proportion of $PbTiO_3$ rose above 55.5 mol percent or fell to below 34.0 mol percent, there was not obtained a piezoelectric material having the desired properties. Or even if there was not raised any problem with the piezoelectric properties, there was not realized a product which preserved a satisfactory stability in the piezoelectric properties. Accordingly, the proportion of $PbTiO_3$ should always be limited to the aforementioned range. This means that another component $PbZrO_3$ involved in said ternary basic constituent should always be limited to the range of 16.0 to 53.5 mol percent. After all, the proportions of the three basis components of $PbTiO_3$, $PbZrO_3$ and $Pb(Cd_{1/3}\cdot Nb_{2/3})O_3$ are required to fall within the hatched range indicated in the triangular chart of FIG. 1 showing said ternary system. Further determination was made of variations in the dielectric constant due to temperature change in connection with Example 282 (Curie point 330° C.) and Example 294 (Curie point 310° C.), showing that they had a tendency of variation illustrated in FIG. 22. In this figure, curves 282 and 294 represent experiments 282 and 294. Determination was also made of variations in the electro-mechanical coupling coefficient $Kp$ due to temperature change in connection with both examples, showing, as seen from FIG. 23, that due to their high Curie points, they varied little in the electro-mechanical coupling coefficient $Kp$ over a temperature range of −100 to 200° C., thus enabling its high coefficient $Kp$ to be practically utilized in a stable form. In FIG. 23, curves 282' and 294' represent Examples 282 and 294, respectively.

Further, there were prepared resonators from piezoelectric materials having the same compositions as those of Examples 255 and 270 given in Table 4, Example 155 (Table 3) and Example 15 (Table 1). Determination was made of change with time in the frequency and electro-mechanical coupling coefficient $Kp$ in the diametrical direction with respect to said resonators, showing that they had a tendency of variation illustrated in FIGS. 24 and 25, a proof that the piezoelectric material of the present invention maintains good properties during a long period of time after polarization and is adapted for use in a filter or the like. In FIGS. 24 and 25, curves 255 and 255' represent Example 255, curves 270 and 270' Example 270, curves 155 and 155' Example 155 and curves 15 and 15' Example 15.

Further, there were prepared resonators from piezoelectric materials having the same composition as those of Examples 302 and 317 in Table 4 and the known piezoelectric material having a composition of $$Pb(Ti_{0.48}Zr_{0.52})O_3+0.7 \text{ wt. percent } Nb_2O_5$$

Determination was made of variations in the resonance frequency due to temperature change over a temperature range of −40 to 70° C., with respect to these resonators, showing that they had a tendency of variation illustrated in FIG. 26, proving to be always capable of exhibiting an excellent performance. In FIG. 26, curves 302 and 317 denote Examples 302 and 317 and curve *i* the sample of the prior art piezoelectric material.

EXAMPLE V

Addition of $ThO_2$ and/or $CeO_2$ (including for comparison one example only consisting of the basic constituent)

The samples of this example were prepared in the same manner as in Example I. The compositions and properties of these samples are presented in Table 5 following.

TABLE 5

| Sample No. | Basic constituent (mol percent) | | | Auxiliary component (percent by weight) | FT | d | ε | Kp | $Q_M$ |
|---|---|---|---|---|---|---|---|---|---|
| | $PbTiO_3$ | $PbZrO_3$ | $Pb(Cd_{1/3}Nb_{2/3})O_3$ | | | | | | |
| Example: | | | | | | | | | |
| 357 | 55.5 | 43.5 | 1.0 | $ThO_2$, 1.5 | 1,280 | 7.53 | 874 | 46.3 | 382 |
| 358 | 55.5 | 43.5 | 1.0 | $CeO_2$, 1.5 | 1,280 | 7.54 | 900 | 46.8 | 401 |
| 359 | 55.0 | 44.0 | 1.0 | $ThO_2$, 0.1 | 1,280 | 7.50 | 955 | 45.1 | 350 |
| 360 | 55.0 | 44.0 | 1.0 | $CeO_2$, 0.1 | 1,280 | 7.52 | 964 | 45.4 | 402 |
| 361 | 55.0 | 44.0 | 1.0 | $ThO_2$, 1.0 | 1,260 | 7.55 | 947 | 48.0 | 411 |
| 362 | 55.0 | 44.0 | 1.0 | $ThO_2$, 2.0 | 1,250 | 7.51 | 913 | 47.7 | 368 |
| 363 | 55.0 | 40.0 | 5.0 | $CeO_2$, 0.5 | 1,260 | 7.56 | 1,031 | 46.5 | 473 |
| 364 | 55.0 | 40.0 | 5.0 | $ThO_2$, 1.5 | 1,250 | 7.60 | 1,102 | 49.4 | 637 |
| 365 | 55.0 | 40.0 | 5.0 | $CeO_2$, 3.0 | 1,240 | 7.53 | 1,064 | 45.9 | 396 |
| 366 | 55.0 | 30.0 | 15.0 | $ThO_2$, 0.6 | 1,250 | 7.54 | 1,226 | 48.2 | 509 |
| 367 | 55.0 | 30.0 | 15.0 | $ThO_2$, 1.5 | 1,230 | 7.65 | 1,173 | 50.3 | 792 |
| 368 | 55.0 | 30.0 | 15.0 | $CeO_2$, 2.5 | 1,220 | 7.61 | 1,144 | 48.0 | 593 |
| 369 | 55.0 | 20.0 | 25.0 | $CeO_2$, 0.5 | 1,240 | 7.49 | 1,281 | 47.6 | 490 |
| 370 | 55.0 | 20.0 | 25.0 | $ThO_2$, 1.5 | 1,230 | 7.67 | 1,209 | 51.3 | 643 |
| 371 | 55.0 | 20.0 | 25.0 | $ThO_2$, 2.3 | 1,220 | 7.58 | 1,211 | 48.8 | 516 |
| 372 | 48.0 | 50.0 | 2.0 | $CeO_2$, 0.8 | 1,250 | 7.55 | 896 | 49.8 | 615 |
| 373 | 48.0 | 50.0 | 2.0 | $CeO_2$, 1.6 | 1,240 | 7.66 | 913 | 53.7 | 727 |
| 374 | 48.0 | 45.0 | 7.0 | $ThO_3$, 0.1 | 1,250 | 7.56 | 1,130 | 56.6 | 749 |
| 375 | 48.0 | 45.0 | 7.0 | $CeO_2$, 1.5 | 1,230 | 7.70 | 1,224 | 64.2 | 985 |
| 376 | 48.0 | 45.0 | 7.0 | $ThO_2$, 1.6 | 1,230 | 7.71 | 1,251 | 65.0 | 913 |
| 377 | 48.0 | 45.0 | 7.0 | $ThO_2$, 2.7 | 1,220 | 7.63 | 1,206 | 60.5 | 716 |
| 378 | 48.0 | 40.0 | 12.0 | $ThO_2$, 0.5 | 1,220 | 7.61 | 1,272 | 60.6 | 835 |
| 379 | 48.0 | 40.0 | 12.0 | $CeO_2$, 1.0 | 1,210 | 7.63 | 1,246 | 63.7 | 2,016 |
| 380 | 48.0 | 40.0 | 12.0 | $CeO_2$, 2.0 | 1,200 | 7.61 | 1,215 | 69.5 | 1,384 |
| 381 | 48.0 | 40.0 | 12.0 | $CeO_2$, 2.8 | 1,200 | 7.57 | 1,261 | 59.5 | 647 |
| 382 | 48.0 | 30.0 | 22.0 | $ThO_2$, 1.0 | 1,200 | 7.60 | 1,736 | 62.8 | 903 |
| 383 | 48.0 | 30.0 | 22.0 | $ThO_2$, 1.5 | 1,190 | 7.66 | 1,612 | 64.7 | 720 |
| 384 | 48.0 | 20.0 | 32.0 | $CeO_2$, 0.0 | 1,180 | 7.50 | 1,850 | 50.2 | 237 |
| 385 | 48.0 | 20.0 | 32.0 | $CeO_2$, 1.5 | 1,170 | 7.62 | 1,794 | 60.8 | 1,315 |
| 386 | 48.0 | 20.0 | 32.0 | $ThO_2$, 1.5 | 1,170 | 7.64 | 1,829 | 61.1 | 1,063 |
| 387 | 43.0 | 52.0 | 5.0 | $CeO_2$, 0.5 | 1,190 | 7.52 | 1,357 | 52.6 | 606 |
| 388 | 43.0 | 52.0 | 5.0 | $ThO_2$, 1.5 | 1,180 | 7.60 | 1,305 | 58.3 | 1,244 |
| 389 | 43.0 | 52.0 | 5.0 | $ThO_2$, 3.0 | 1,170 | 7.55 | 1,369 | 50.3 | 643 |
| 390 | 43.0 | 42.0 | 15.0 | $ThO_2$, 0.5 | 1,170 | 7.61 | 1,601 | 52.5 | 769 |
| 391 | 43.0 | 42.0 | 15.0 | $ThO_2$, 1.5 | 1,160 | 7.68 | 1,570 | 58.3 | 1,763 |
| 392 | 43.0 | 42.0 | 15.0 | $CeO_2$, 1.7 | 1,160 | 7.70 | 1,428 | 56.3 | 3,288 |
| 393 | 43.0 | 42.0 | 15.0 | $CeO_2$, 2.6 | 1,150 | 7.59 | 1,473 | 51.8 | 5,526 |
| 394 | 43.0 | 32.0 | 25.0 | $ThO_2$, 1.5 | 1,150 | 7.54 | 2,008 | 55.8 | 917 |
| 395 | 43.0 | 32.0 | 25.0 | $CeO_2$, 2.0 | 1,150 | 7.53 | 1,996 | 54.2 | 746 |
| 396 | 43.0 | 22.0 | 35.0 | $ThO_2$, 0.5 | 1,140 | 7.53 | 1,392 | 48.4 | 504 |
| 397 | 43.0 | 22.0 | 35.0 | $ThO_2$, 1.5 | 1,130 | 7.50 | 1,361 | 50.0 | 1,011 |
| 398 | 43.0 | 22.0 | 35.0 | $ThO_2$, 3.0 | 1,120 | 7.51 | 1,321 | 46.6 | 483 |
| 399 | 43.0 | 16.0 | 41.0 | 0 | 1,130 | 7.38 | 1,116 | 45.0 | 243 |
| 400 | 43.0 | 16.0 | 41.0 | $CeO_2$, 0.4 | 1,120 | 7.48 | 1,180 | 48.1 | 617 |
| 401 | 43.0 | 16.0 | 41.0 | $CeO_2$, 1.1 | 1,120 | 7.57 | 1,132 | 51.4 | 995 |
| 402 | 43.0 | 16.0 | 41.0 | $CeO_2$, 2.6 | 1,110 | 7.50 | 1,145 | 49.0 | 506 |
| 403 | 39.5 | 53.5 | 7.0 | $ThO_2$, 1.5 | 1,230 | 7.53 | 1,311 | 48.5 | 364 |
| 404 | 39.5 | 53.5 | 7.0 | $CeO_2$, 1.5 | 1,230 | 7.52 | 1,308 | 47.9 | 422 |
| 405 | 38.0 | 53.0 | 9.0 | $CeO_2$, 0.5 | 1,220 | 7.50 | 1,196 | 47.9 | 422 |
| 406 | 38.0 | 53.0 | 9.0 | $ThO_2$, 1.0 | 1,210 | 7.52 | 1,184 | 50.6 | 892 |
| 407 | 38.0 | 53.0 | 9.0 | $ThO_2$, 2.1 | 1,200 | 7.54 | 1,166 | 48.7 | 485 |
| 408 | 38.0 | 43.0 | 19.0 | $ThO_2$, 1.0 | 1,190 | 7.51 | 1,402 | 53.1 | 674 |
| 409 | 38.0 | 33.0 | 29.0 | $ThO_2$, 1.0 | 1,160 | 7.56 | 1,084 | 52.4 | 746 |
| 410 | 38.0 | 23.0 | 39.0 | $CeO_2$, 1.0 | 1,130 | 7.48 | 961 | 48.3 | 587 |
| 411 | 38.0 | 18.0 | 44.0 | $ThO_2$, 1.5 | 1,110 | 7.46 | 783 | 48.5 | 544 |
| 412 | 38.0 | 18.0 | 44.0 | $ThO_2$, 1.0<br>$CeO_2$, 1.0 | 1,100 | 7.43 | 792 | 46.2 | 481 |
| 413 | 38.0 | 18.0 | 44.0 | $CeO_2$, 3.0 | 1,100 | 7.40 | 765 | 45.1 | 394 |
| 414 | 35.0 | 17.0 | 48.0 | $CeO_2$, 0.5 | 1,110 | 7.46 | 751 | 47.4 | 417 |
| 415 | 35.0 | 27.0 | 38.0 | $ThO_2$, 1.0 | 1,140 | 7.51 | 963 | 48.9 | 486 |
| 416 | 35.0 | 36.0 | 29.0 | $ThO_2$, 1.5 | 1,160 | 7.64 | 946 | 53.2 | 625 |
| 417 | 35.0 | 44.0 | 21.0 | $CeO_2$, 2.0 | 1,150 | 7.60 | 1,230 | 51.8 | 748 |
| 418 | 35.0 | 53.0 | 12.0 | $ThO_2$, 1.5 | 1,200 | 7.56 | 1,105 | 49.7 | 417 |
| 419 | 34.0 | 16.0 | 50.0 | $CeO_2$, 1.5 | 1,100 | 7.47 | 758 | 45.4 | 323 |
| 420 | 34.0 | 16.0 | 50.0 | $ThO_2$, 1.0 | 1,100 | 7.42 | 733 | 44.4 | 301 |
| 421 | 34.0 | 16.0 | 50.0 | $CeO_2$, 1.0 | 1,100 | 7.44 | 726 | 45.0 | 317 |
| 422 | 34.0 | 16.0 | 50.0 | $ThO_2$, 2.5 | 1,100 | 7.40 | 714 | 44.0 | 296 |
| 423 | 34.0 | 16.0 | 50.0 | $CeO_2$, 2.5 | 1,100 | 7.41 | 709 | 43.9 | 283 |

Clearly to define the relationship of the basic constituent and piezoelectric properties, determination was made of variations in the electro-mechanical coupling coefficient Kp and mechanical quality factor of said samples by varying the proportions of $Pb(Cd_{1/3}\cdot Nb_{2/3})O_3$, $PbTiO_3$ and $PbZrO_3$ forming the basic constituent with addition of $ThO_2$ fixed at 1.3 parts by weight per 100 parts by weight of said basic constituent, showing that they had a tendency of variation illustrated in FIG. 27. Where the proportion of $Pb(Cd_{1/3}\cdot Nb_{2/3})O_3$ fell outside of the range of 1.0 to 50 mol percent, there was not obtained a piezoelectric material having the desired properties. In FIG. 27, curve *j* represents the electro-mechanical coupling coefficient Kp and curve *k* the mechanical quality factor $Q_M$. The reason why the proportion of $PbTiO_3$ involved in the basic constituent is limited to the range of 34.0 to 55.5 mol percent is that where said proportion falls outside of this range, the resultant piezoelectric material can not display a large electro-mechanical coupling coefficient Kp and maintain the quality of little varying in the piezoelectric properties with respect to temperature change and over a long period of time after polarization, failing to be suitably used in practical application, for example, as an oscillation element for generating supersonic waves. Further, determination was made of variations in the electro-mechanical coupling coefficient Kp and mechanical quality factor $Q_M$ of said samples by varying the proportions of $PbTiO_3$ and $PbZrO_3$ involved in said basic constituent with addition of auxiliary $CeO_2$ fixed at 1.5 parts by weight per 100 parts by weight of said basic constituent and the proportion of $Pb(Cd_{1/3}\cdot Nb_{2/3})O_3$ included in said basic constituent at 10 mol percent, showing that they had a tendency of variation illustrated in FIG. 28. In this figure, curve *j'* denotes the electro-mechanical coupling coefficient Kp and curve *k'* the mechanical quality factor $Q_M$. As apparent from FIGS. 27 and 28, where the proportion of $PbTiO_3$ falls outside of the range of 34.0 to 55.5 mol percent there is not obtained a piezoelectric material having the desired properties. Even if such samples raise no problem with the piezoelectric properties themselves, they fail to maintain stability therein. Accordingly, the proportion of $PbTiO_3$ should always be limited to the aforementioned range. This means that another component of $PbZrO_3$ should always be limited to the range of 16.0 to 53.5 mol percent. After all, the proportions of said three basic components should be limited to the hatched range indicated in the triangular chart of FIG. 1 showing said ternary system. Determination was also made of variations in the dielectric constant due to temperature change in connection with Example 376 (Curie point 380° C.) and Example 394 (Curie point 310° C.), showing that they had a tendency of variation illustrated in FIG. 29. In this figure, curves 376 and 394 denote Examples 376 and 394. Further determination was made of variations in the electro-mechanical coupling coefficient K*p* due to temperature change in connection with both examples, showing that they had a tendency of variation illustrated in FIG. 30, and that due to their high Curie points, they varied little in the electro-mechanical coupling coefficient K*p* over a temperature range of −100 to 200° C., enabling its high coefficient K*p* to be used in practical application in a stable form. In FIG. 30, curves 376′ and 394′ represent Examples 376 and 394, respectively.

There were prepared resonators from piezoelectric materials having the same compositions as those of Examples 380 and 397 in Table 5, Example 23 (Table 1) and Example 46 (Table 1). Determination was made of change with time in the resonance frequency and electro-mechanical coupling coefficient K*p* in the diametrical direction of said examples, showing that they had a tendency of variation illustrated in FIGS. 31 and 32, a proof that a piezoelectric material of the present invention maintains good properties over a long period of time after polarization and is adapted for use in practical application, for example, in a filter. In FIGS. 31 and 32, curves 380 and 380′ represent Example 308, curves 397 and 397′ Example 397, curves 23 and 23′ Example 23, and curves 46 and 46′ Example 46.

Further, there were prepared resonators from piezoelectric materials having the same compositions as those of Examples 367 and 416 in Table 5 and the known piezoelectric material having a composition of $$Pb(Ti_{0.48} \cdot Zr_{0.52})O_3 + 0.7 \text{ wt. percent } Nb_2O_5$$

Determination was made of variations in the resonance frequency due to temperature change over a temperature range of −40 to 80° C. in connection with said resonators, showing that they had a tendency of variation illustrated in FIG. 33, proving to be always capable of displaying an excellent performance. In FIG. 33, curves 367 and 416 represent Examples 367 and 416, curve *l* the prior art sample which was deemed to have particularly excellent piezoelectric properties, and curve *m* another prior art sample.

As apparent from the aforementioned Examples I to V, the piezoelectric material of the present invention has excellent piezoelectric properties and varies little in said properties with respect to temperature change and over a long period of time, exhibits a superb performance as a piezoelectric ignition element or a transducer like a pickup, and particularly when used in an electric filter, minimizes loss due to a large mechanical quality factor $Q_M$. All these characteristics offer a great many industrial advantages.

What we claim is:

1. An oxide piezoelectric material essentially consisting of a solid solution having a composition represented by the following formula:

$$x \cdot Pb(Cd_{1/3} \cdot Nb_{2/3}O_3\text{-}y \cdot PbTiO_3\text{-}z \cdot PbZrO_3$$

where:

$x$ is 50.0 to 1.0 mol percent,
$y$ is 34.0 to 55.5 mol percent, and
$z$ is 16.0 to 53.5 mol percent.

2. The oxide piezoelectric material according to claim 1 which further contains 0.01 to 2.0 percent by weight of $MnO_2$ based on the total weight of said material.

3. The oxide piezoelectric material according to claim 1 which further contains 0.05 to 2.0 percent by weight of $Cr_2O_3$ based on the total weight of said material.

4. The oxide piezoelectric material according to claim 1 which further contains 0.1 to 2.5 percent by weight of at least one selected from NiO and CoO based on the total weight of said material.

5. The oxide piezoelectric material according to claim 1 which further contains 0.1 to 3.0 percent by weight of at least one selected from $La_2O_3$ and $Bi_2O_3$ based on the total weight of said material.

6. The oxide piezoelectric material according to claim 1 which further contains 0.1 to 3.0 percent by weight of at least one selected from $ThO_2$ and $CeO_2$ based on the total weight of said material.

References Cited

UNITED STATES PATENTS

| | | | |
|---|---|---|---|
| 3,403,103 | 9/1968 | Ouchi et al. | 252—62.9 |
| 3,544,469 | 12/1970 | Watanabe et al. | 252—62.9 |
| 3,518,199 | 6/1970 | Tsubouchi et al. | 252—62.9 |
| 3,531,412 | 9/1970 | Nishida et al. | 252—62.9 |
| 3,268,453 | 8/1966 | Ouchi et al. | 252—62.9 |
| 3,117,094 | 1/1964 | Roup et al. | 252—62.9 |

FOREIGN PATENTS

| | | | |
|---|---|---|---|
| 1,189,906 | 3/1965 | Germany | 252—62.9 |

TOBIAS E. LEVOW, Primary Examiner
J. COOPER, Assistant Examiner

U.S. Cl. X.R.

106—39 R

UNITED STATES PATENT OFFICE
CERTIFICATE OF CORRECTION

Patent No. 3,661,781 Dated May 9, 1972

Inventor(s) NOBORU ICHINOSE et al

It is certified that error appears in the above-identified patent and that said Letters Patent are hereby corrected as shown below:

Column 4, line 2 - replace "curved" with ---curve--- .

Column 5, line 22 - replace "$PPbTiO_3$" with ---$PbTiO_3$--- .

Column 13, line 6 - replace "$Nb_{2/3}$" with ---$Nb_{2/3}$)--- .

Signed and sealed this 5th day of March 1974.

(SEAL)
Attest:

EDWARD M. FLETCHER, JR.
Attesting Officer

C. MARSHALL DANN
Commissioner of Patents